Oct. 13, 1959  F. B. BERGER ET AL  2,908,903
COURSE AND SPEED INDICATING SYSTEM
Filed Oct. 3, 1951  13 Sheets-Sheet 1

Inventor
FRANCE B. BERGER
WILLIAM J. TULL
JOHN W. GRAY

By H. A. Mackey
Attorney

Oct. 13, 1959   F. B. BERGER ET AL   2,908,903
COURSE AND SPEED INDICATING SYSTEM
Filed Oct. 3, 1951   13 Sheets-Sheet 2

Inventor
FRANCE B. BERGER
WILLIAM J. TULL
JOHN W. GRAY
By H.S. Mackey
Attorney

Oct. 13, 1959

F. B. BERGER ET AL 2,908,903

COURSE AND SPEED INDICATING SYSTEM

Filed Oct. 3, 1951

Inventor
FRANCE B. BERGER
WILLIAM J. TULL
JOHN W. GRAY

By

Oct. 13, 1959　　F. B. BERGER ET AL　　2,908,903
COURSE AND SPEED INDICATING SYSTEM

Filed Oct. 3, 1951　　　　　　　　　　　　　13 Sheets-Sheet 5

Inventor
FRANCE B. BERGER
WILLIAM J. TULL
JOHN W. GRAY

Oct. 13, 1959     F. B. BERGER ET AL     2,908,903
COURSE AND SPEED INDICATING SYSTEM

Filed Oct. 3, 1951     13 Sheets-Sheet 6

Inventor
FRANCE B. BERGER
WILLIAM J. TULL
JOHN W. GRAY

Oct. 13, 1959   F. B. BERGER ET AL   2,908,903
COURSE AND SPEED INDICATING SYSTEM
Filed Oct. 3, 1951   13 Sheets-Sheet 7

Inventor
FRANCE B. BERGER
WILLIAM J. TULL
JOHN W. GRAY
By
Attorney

Oct. 13, 1959  F. B. BERGER ET AL  2,908,903
COURSE AND SPEED INDICATING SYSTEM
Filed Oct. 3, 1951  13 Sheets-Sheet 9

Inventor
FRANCE B. BERGER
WILLIAM J. TULL
JOHN W. GRAY

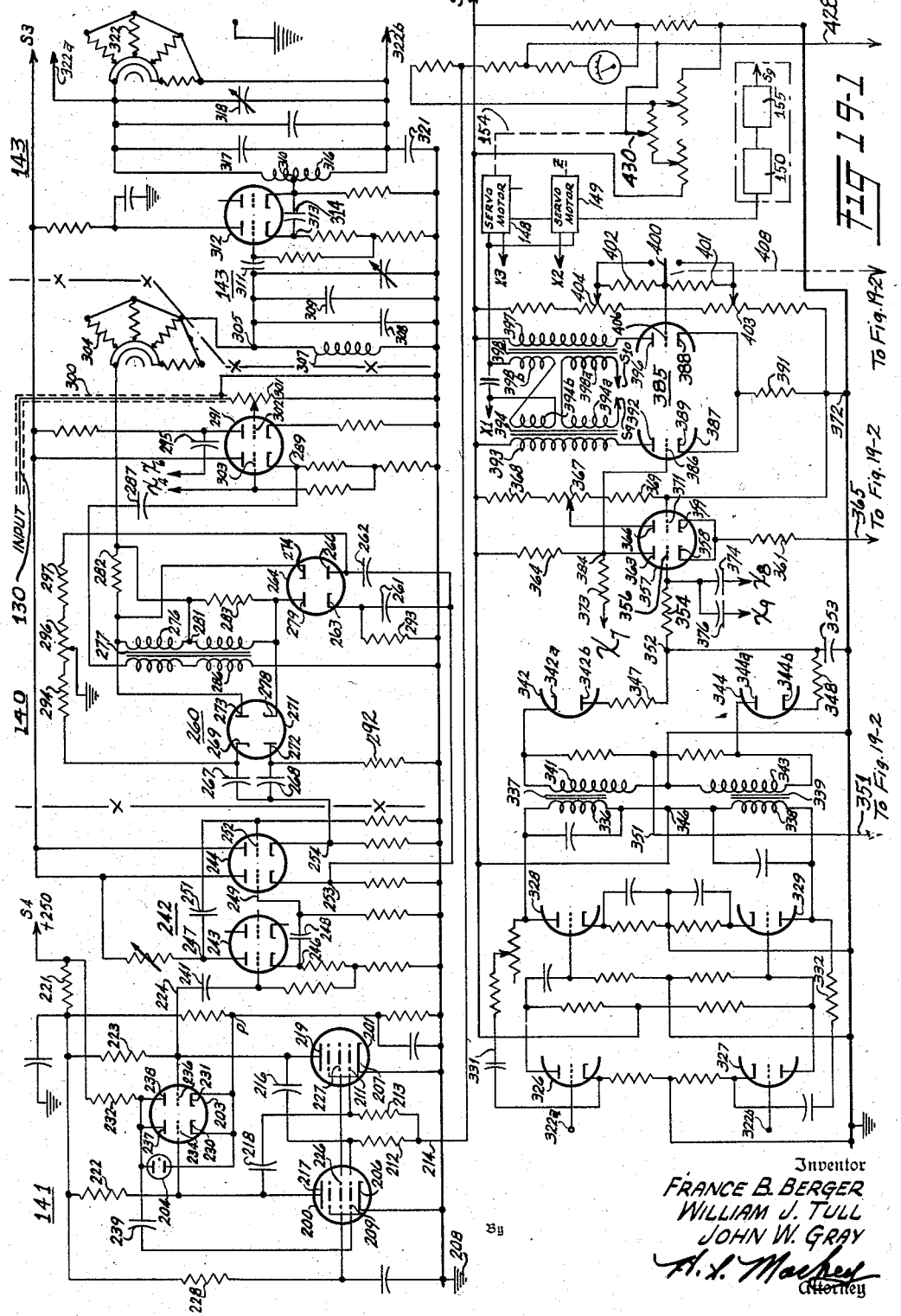

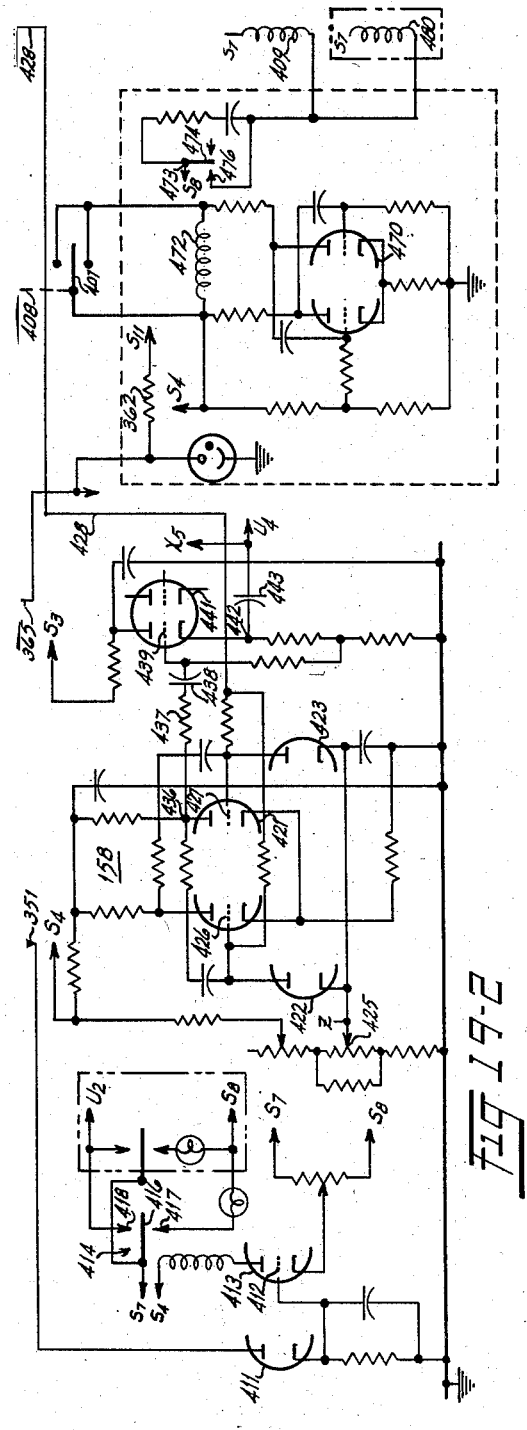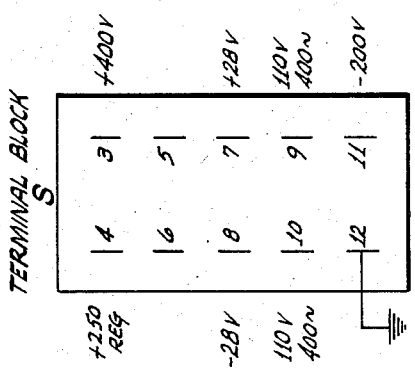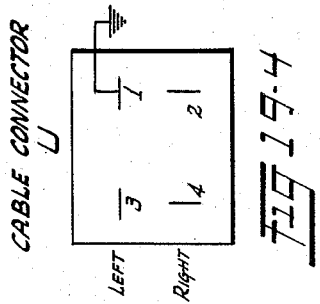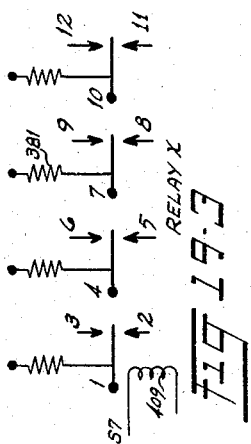
Inventor
FRANCE B. BERGER
WILLIAM J. TULL
JOHN W. GRAY Inventor
FRANCE B. BERGER
WILLIAM J. TULL
JOHN W. GRAY
Attorney

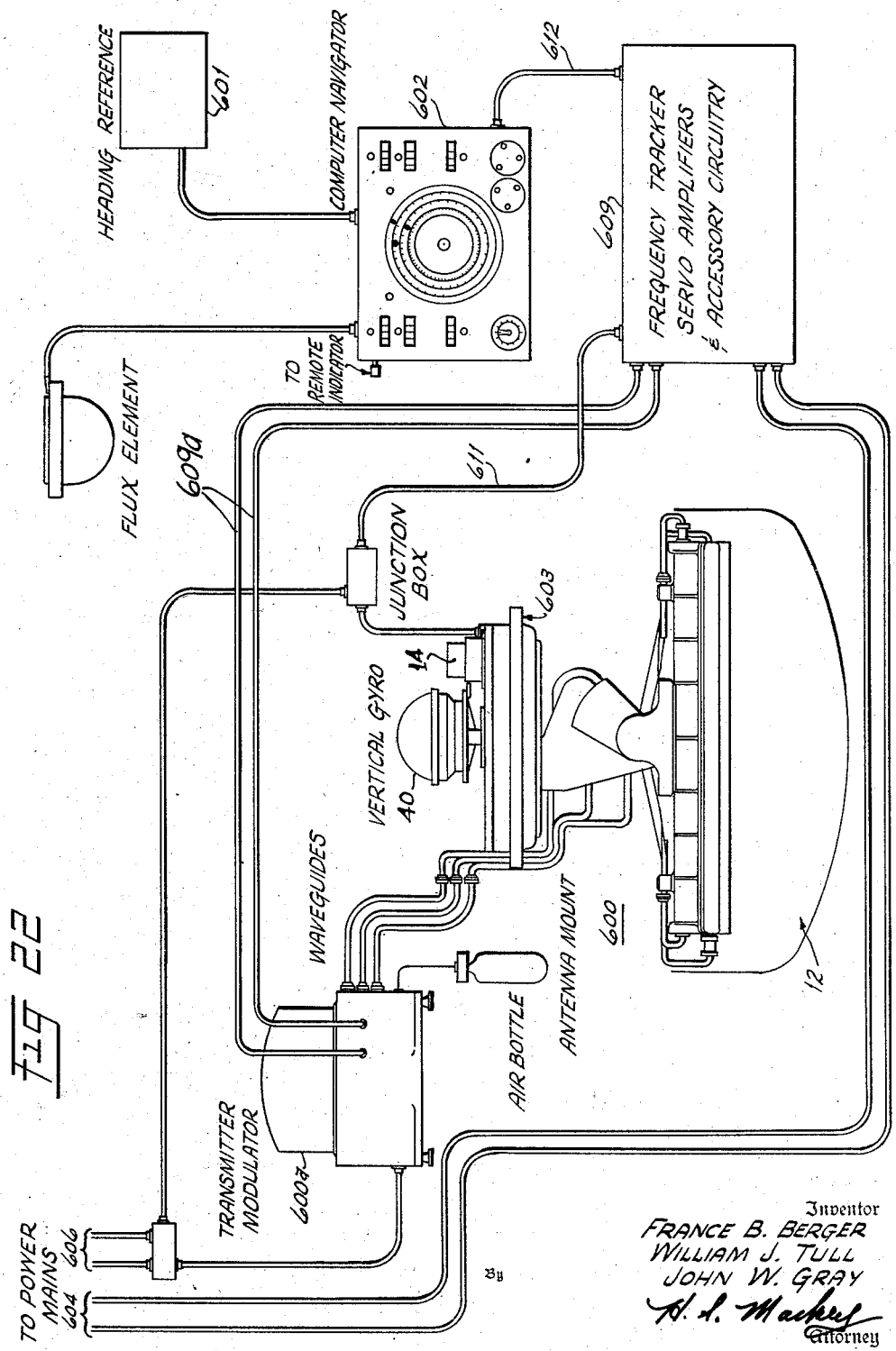

United States Patent Office 2,908,903
Patented Oct. 13, 1959

2,908,903

COURSE AND SPEED INDICATING SYSTEM

France B. Berger and William J. Tull, Pleasantville, and John W. Gray, White Plains, N.Y., assignors to General Precision Laboratory Incorporated, a corporation of New York Application October 3, 1951, Serial No. 249,472

14 Claims. (Cl. 343—9)

This invention relates to means for determining the relative speed and direction of travel between the earth's surface and any arbitrary reference on a vehicle. The invention is particularly applicable to the navigation of aircraft but it is also applicable to the navigation of any vehicle.

More specifically, the present invention relates to apparatus utilizing the well-known phenomenon, known as the Doppler effect, for determining the actual direction and speed of relative movement between a source of microwave energy carried by a vehicle and any body, such as the earth, with respect to which the vehicle is moving.

It is well known that when an observer approaches a source of sound waves he notes an apparent increase in frequency of the sound, and a decrease in frequency if he is going away from the source. This phenomenon is usually experienced in everyday life in connection with the sound of a train whistle as the train approaches the observer and then passes into the distance. It is immaterial whether the source of the sound waves or the observer is moving; the relative movement is the determining factor. This phenomenon is known as the Doppler effect and applies to radio waves as well as to sound waves.

It is well known that the Doppler effect can be utilized in a radio navigation system to determine direction and speed. In the type of system to which the present invention pertains, the original source of the radio waves must be carried by the vehicle, such as an aircraft, but the source of waves corresponding to the example of the train whistle is the illuminated area on the earth or planetary body from which the radio waves are reflected, the "observer" in this instance being the measuring instruments in the vehicle. Thus, the change in frequency may be used to indicate the relative velocity of the vehicle with respect to the earth. The component of movement parallel to a straight line joining the illuminated area on the earth and the vehicle is effective in causing a Doppler change in frequency and the component perpendicular to this line produces no such effect. In general, the change in frequency observed is proportional to the cosine of the angle between the straight line joining the observation point and the illuminated area and a line defining the true velocity vector of the vehicle.

The present invention provides means for radiating microwave energy from a vehicle, such as an aircraft, toward the earth and simultaneously receiving reflected signals from spaced areas on the earth. Any apparent difference in frequency in the reflected microwaves will indicate an unsymmetrical disposition of the receiving means relative to the true velocity vector of the aircraft. In accordance with a predetermined arrangement the difference in apparent frequency of the received signals will be proportional to the drift of the vehicle, while the average of the frequencies of the received signals will be proportional to the velocity of the aircraft.

As mentioned above, the apparent shift in frequency is directly proportional to the velocity of the vehicle along a line coinciding with the velocity vector of relative movement which is the line joining the point of observation and the point on the body from which the wave is reflected, and may be expressed by the formula $$\Delta f = 2f\frac{V}{C} \quad (1)$$

where $\Delta f$ is the apparent change in frequency between the original source and the reflected wave, usually referred to as the Doppler shift, $f$ is the frequency of the original source of the transmitted wave, $V$ is the velocity of the relative movement between the vehicle and the earth, and $C$ is the velocity of the transmitted wave energy, in the case of electromagnetic waves being approximately 300,000,000 meters per second. It is to be emphasized that the above formula holds true only so long as the waves are transmitted and received in a direction corresponding with the velocity vector the value of which is to be determined. It will be readily apparent that in the case of aircraft the waves cannot ordinarily be projected directly along the line of movement because they would never reach the earth's surface to be reflected thereby. Accordingly, it is necessary that the waves be directed at an angle with respect to the velocity vector and therefore the above formula must be corrected by a factor which is the cosine of the angle of transmission as respects the direction of the velocity vector. This formula then becomes $$f = \frac{2fV \cos \theta}{C} \quad (2)$$

where $\theta$ is the angle between the direction of propagation of the waves and the velocity vector.

The primary object of the present invention is to provide an improved navigational system component of the type generally mentioned above in which means are provided for accurately determining the relative speed and direction between relatively moving bodies, such as an aircraft and the earth.

Another object is to provide improved apparatus using radiant wave energy in which the wave energy is projected from a vehicle, such as an aircraft in the form of a plurality of independent patterns which will strike the earth at widely spaced points thereon in order to increase the accuracy of the system.

Another object is to provide improved apparatus of the type described in which microwave radiation patterns are projected laterally and longitudinally of the craft, the radiation patterns having such shapes that the center of the Doppler frequency spectrum received by antennas on one side of the craft varies in one direction while the center of the spectrum received by antennas on the other side decreases when the axis of the antenna system departs from the velocity vector.

Another object is to provide improved apparatus of the type described utilizing a plurality of radiant energy wave patterns which are projected in the general direction of an object from which the radiant energy is to be reflected, the shapes of the patterns of radiation being such that there will be a maximum return of reflected signal energy confined to a frequency spectrum of minimum width.

Another object is to provide apparatus of the type described utilizing radiant wave energy which is projected in the form of three independent radiation patterns in diverse directions from a vehicle, such as an aircraft, the individual radiation patterns being of such shape that the scattering effect of the irregularities of the earth's surface will produce a minimum width of frequency spectrum in the reflected wave at the same time that a maximum amount of energy is reflected, the system being such that it is capable of accurately indicating the speed and drift of the vehicle regardless of the attitude of the craft with respect to the earth.

Other and further objects will be readily apparent from the following description when taken in consideration with the accompanying drawings in which:

Figure 12 is an enlarged partial side elevational view of the single antenna array of Figs. 11 and 11a.

Figure 18:
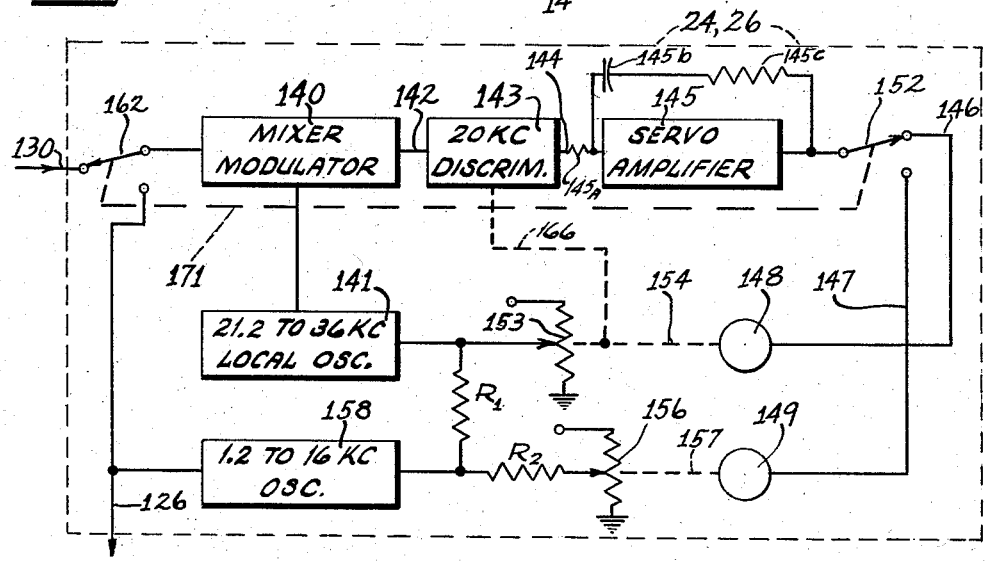
Figure 18 is a diagrammatic representation of the frequency trackers shown in the block diagram for selecting the center of the Doppler frequency spectrum.

Figures 19–1, 19–2, 19–3, 19–4 and 19–5, taken together, constitute a wiring diagram of the frequency trackers diagrammatically illustrated in Fig. 18.

Figure 20:
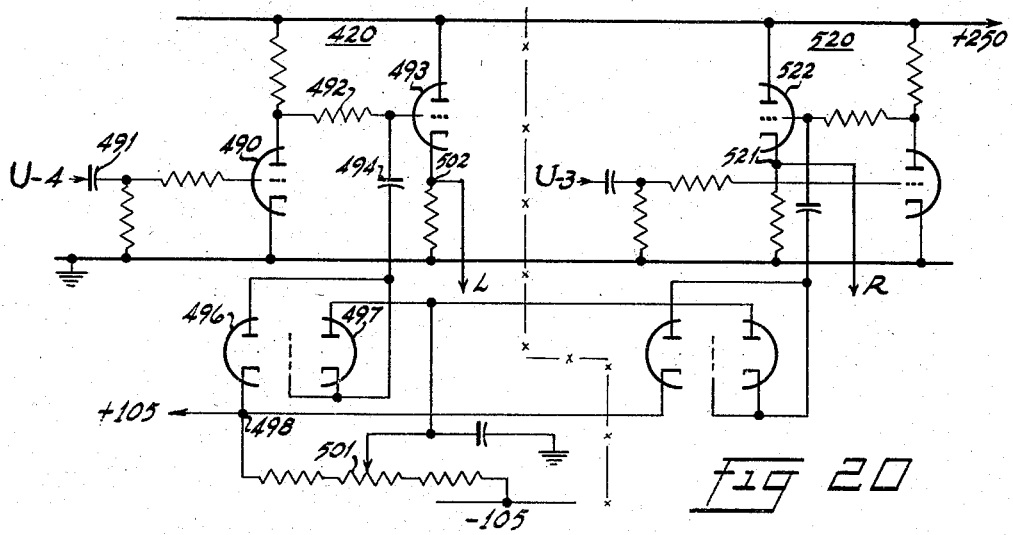

Figure 20 is a wiring diagram of the limiting amplifier for controlling the output signals from the frequency trackers to the antenna servo motors.

Figure 21:
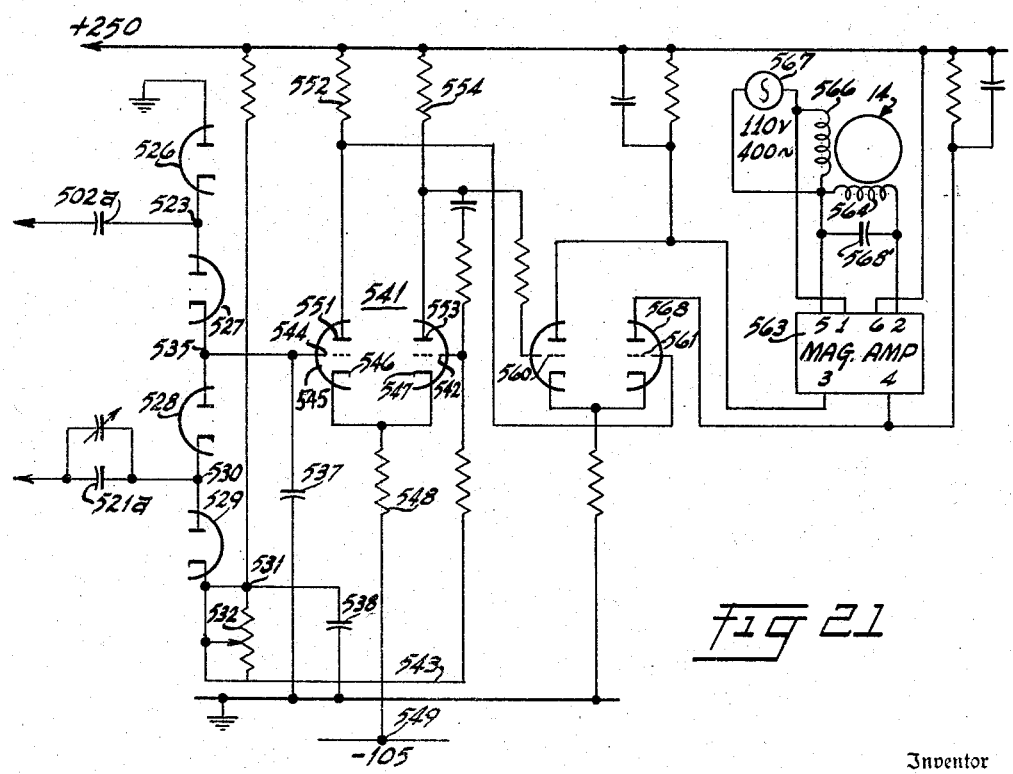

Figure 21 is a wiring diagram of the final amplifier and antenna servo motors.

Figure 22 is a schematic diagram illustrating the adaptation of the present invention to a complete navigational system for continuous worldwide navigation of aircraft.

The present invention provides an important component which may be used in an automatic system for continuous worldwide navigation of vehicles, such as aircraft, with respect to the earth or for that matter with respect to any of the planetary bodies. The device is capable of continuously indicating with a high degree of accuracy the instantaneous speed and direction of the craft with respect to the earth so that given one point on the earth and direction, it is theoretically possible to navigate the craft to any point on the surface of the earth. The speed and direction information provided by the present apparatus may be supplemented by other apparatus which will provide a corrected heading reference so that it is not necessary for a navigator to estimate his position by making the necessary correction for drift and changes in flying attitude of the aircraft. The information or intelligence provided by the present invention may be combined with information from a component for automatically giving a continuously corrected heading reference to provide data for a computer device so that an aircraft can be automatically navigated between any two given points on the earth with the computer giving the exact instantaneous position and distance to destination. It also follows that with such a system it would be possible to change the destination at any time after the craft leaves its initial point of departure and navigate from point to point.

One of the important features of the present system is the special radiating system which projects radiant wave energy in a plurality of different directions toward the earth, the characteristics of the radiation patterns being such that a maximum of the reflected wave energy will be concentrated within a frequency spectrum of minimum width.

It will be readily understood that because of the irregularities of the earth's surface any radiant energy which is directed against the earth will be reflected at various angles depending upon the angle of the incident ray. It will also be evident that since the present apparatus does not rely upon the reflected wave energy from any specific point or object on the earth it is necessary that the apparatus be responsive to the average of the energy in the reflected waves. Accordingly, it is highly important that the radiation pattern of the original source of energy be such that peaks of reflected energy be kept to a minimum. It will also be understood from the formula mentioned above, that the vehicle, or aircraft, will have a velocity vector which is different with respect to each and every point on the earth. As will be apparent from the subsequent description, it is highly desirable to reduce to a minimum the width of the spectrum of frequencies which will be reflected from the continuously changing area of illumination on the earth's surface.

The present invention provides a system whereby any departure of the axis of the antenna system from symmetry with respect to the iso-frequency contour lines which are inherently centered on the ground track for reasons apparent later, is utilized to reorient the antenna and at the same time indicate the drift angle between the heading of the aircraft and the true direction of travel.

Specifically, the present invention provides a special antenna system combined with a unique system for measuring the centers of the Doppler frequency spectra reflected from the earth's surface and producing control signals proportional to these center frequencies for continuous reorientation of the antenna system along the true velocity vector thereby providing a continuous indication of the drift and direction of movement of the aircraft.

Figure 1:
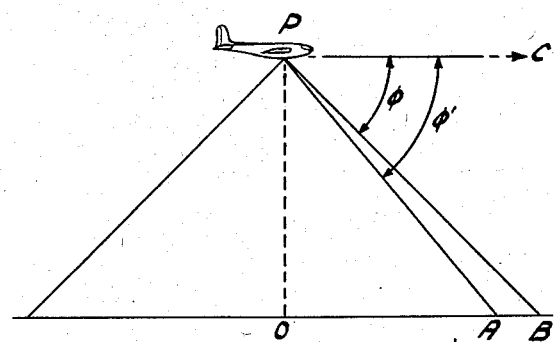
Figure 1 is a representation of the geometrical relationships involving in connection with the present invention when an aircraft is flying above the earth's surface and transmits and receives a signal reflected from the earth.

It is believed that the above will be better understood by referring to Figs. 1 to 4, inclusive. Referring specifically to Fig. 1, let it be assumed that the aircraft P is moving relative to the earth's surface along a velocity vector indicated at C. Then if the radiant energy be thought of as directed along a single line to the point B on the earth's surface with the line making an angle $\phi$ with the velocity vector C it will be seen that the velocity of the aircraft with respect to the point B will be different from the velocity of the aircraft with respect to point A, the radiation to which is along a second line making an angle $\phi'$ with the velocity vector C. If the line of radiation be rotated about the velocity vector C a cone will be generated having its apex at the point P.

In case of the present invention the radiant wave energy is directed toward the earth and the energy is scattered and reflected from the irregular surface or objects on the ground. On first consideration it would appear that because the radiation patterns are illuminating a constantly changing area on the earth's surface it would be impossible to determine the speed of the aircraft by the Doppler effect. This gives rise to what appears to be a paradoxical situation because there is no apparent fixed reference point on the earth with respect to which the speed of the aircraft could be measured. However, actual tests have shown that the characteristics of the reflected signals are such that it is possible with the apparatus of the present invention to measure very accurately the speed and direction of the aircraft regardless of its flying attitude.

A beam of radiant energy directed toward the earth will intersect the earth in an area of finite size depending upon the pattern of radiation. When this wave energy strikes the earth's surface it will be reflected in accordance with the well known laws of reflection with the angle of reflection being equal to the angle of incidence, and the incident and reflected rays being in the same plane. It will therefore be obvious that if the earth's surface were a perfect mirror and if the propagated wave energy struck the earth's surface at any angle other than 90° no energy would be reflected back toward the transmitter. However, due to the fact that the earth's surface may be considered to contain substantially an infinite number of reflecting surfaces arranged at random angles it will immediately be seen that a certain amount of energy will be reflected back toward the original source. The present invention provides improved means for making this reflected energy as great as possible.

Since the present invention does not rely for its operation upon the echo from any specific point or object on the earth's surface it might appear off hand that since the aircraft is continuously moving with respect to the earth, the illuminated area on the earth (area of intersection of radiation pattern and the earth's surface) would have a velocity vector equal to the velocity vector of the aircraft which would result in a zero rate of closure between the aircraft and the illuminated area and therefore there would be no Doppler effect produced. However, on the other hand if one considers that the surface of the earth is made up of discrete scattering centers which are randomly placed it will be apparent that these scattering centers are continuously reflecting a certain amount of energy in the direction of the aircraft regardless of the fact that the plane has progressed a finite distance between the time that the original signal was projected toward the earth and the reflected signal is received back at the aircraft. Every discrete scattering center can be considered as a new source of radiation, the reflected energy being reflected back in the direction of the incident ray from the transmitter on the aircraft.

From the above, it will follow that since the effective echoing area is made up of randomly distributed scattering centers, the phases of the reflected waves from these points will likewise be at random. Off hand it might appear that the resultant amplitude of such $n$ sinusoids of random phase and amplitude would be zero but this is not the case; the resultant amplitude of such sinusoids is equal to $\sqrt{n}$ times the amplitude of one component. Since the energy of each sinusoid is proportional to the square of its amplitude, the total energy in a number of sinusoids of random phases is equal to the sum of the squares of the amplitudes of the individual sinusoids.

It is for this reason that a sufficient amount of energy is reflected from the earth from which to make the accurate speed and direction measurements using the Doppler principle in accordance with the present invention.

Accordingly, in utilizing the present apparatus, it can be assumed that the randomly spaced scattering centers constitute a single scattering center having an intensity equal to the summation of the intensities that would be observed if the illuminated scatterers were observed individually rather than simultaneously. As previously mentioned, the moving aircraft will have a different relative velocity with respect to each and every point on the earth. From Equation 2 it will therefore follow that the apparent shift of the frequency of the wave energy from each scattering center will be different and therefore the reflected composite signal observed at the aircraft will not be monochromatic but will include a spectrum of frequencies. Due to the movement of the aircraft the value of the Doppler frequency, $\Delta f$, associated with any particular target or scattering center will constantly vary. Another way of looking at this is to say that the values of $\Delta f$ characterising the reflected signal at any given time cover a range depending upon the width of the radiation pattern. Accordingly, it would follow that by keeping the radiation pattern very sharp in both the horizontal and vertical meridians the spectrum of reflected frequencies would be very small. This is a highly desirable feature. However, in view of the fact that only a very small percentage of the original signal is ever reflected back toward the aircraft, it is essential that the "area of scattering echoes" on the earth's surface be made as large as possible. One of the salient features of the present invention contemplates the provision of a radiating system having patterns which provide a very large area of reflecting echoes of such a shape that the spectrum of frequencies is very narrow.

In the description of this invention it must be kept in mind that the antenna system is used both for transmission and reception. As was previously mentioned the radiation pattern from the transmitter on the aircraft may be thought of as directed along a single line and if this line or pencil of radiation is rotated at a constant angle $\theta$ about the velocity vector PC a cone having an apex angle of $2\theta$ will be generated. The intersection of this cone of radiation with the earth's surface, which for all intents and purposes may be considered as a plane surface, will be a hyperbola. Purely for purposes of convenient analysis let it be assumed that the aircraft is stationary and that the angle $\theta$ is increased. A new cone will be formed which will intersect the earth in a new hyperbola, the points on the new hyperbola being closer to the aircraft. Since the velocity vectors of the aircraft with respect to points on the different hyperbolae will be different, and these vectors will be larger when $\theta$ is smaller. The reason for this will be immediately apparent when it is realized that the velocity vector of the aircraft is least with respect to the point indicated at O on Fig. 1 which is immediately below the aircraft. Since all of the points on the hyperbola satisfy Equation 2 set forth above, it will be seen that the Doppler frequency return will be the same for all points on any one hyperbola. It will follow from the above that a family of hyperbolae can be developed by varying the angle $\theta$. For the purposes of analysis it must be understood that varying the angle $\theta$ produces an effect similar to the forward motion of the aircraft as far as the formation of theoretical successive hyperbolae are considered. It is therefore apparent that considering the different points or sources of reflected radiation, those points which will give a reflected wave of the same Doppler frequency may be connected by lines constituting a family of hyperbolae having axes coinciding with the axis of the aircraft and passing through the point O directly beneath the aircraft.

The present invention utilizes the phenomena described immediately above to obtain reflected signals from a relatively large area of the earth's surface, thereby increasing the amount of energy in the reflected signal, and at the same time relies upon the conical-shaped radiation pattern of the radiation system to follow closely the pattern of the constant frequency contours so that most of the energy of the return signal is concentrated within a very narrow spectrum of Doppler frequencies. This is a highly important feature because it eliminates some of the special filters and gating circuits which were necessary in prior art devices where the energy of the reflected signals was distributed over a very wide spectrum of frequencies. In general, in the prior art the only reflected signal utilized was that from a very specific angle. This was done to avoid the wide frequency spectrum of the reflected signals.

An important feature of the present invention which cooperates with the novel radiation system is a special frequency tracker described in detail later, which produces an output signal proportional to some characteristic such as the center or average of the Doppler frequency specrum. From the foregoing description it will be seen that since the present system utilizes the reflected energy of the center of the Doppler frequency spectrum and since this spectrum is reflected from a continuously changing area of the earth's surface, there may be instants during which there may be no useable echo because of the varying reflecting characteristics of the earth's terrain. This frequency tracker is capable of interpolating for points on the frequency curve during such instants of unusable echo. The significance of the components and organization which carries out this function will be appreciated from subsequent description.

Figure 4:
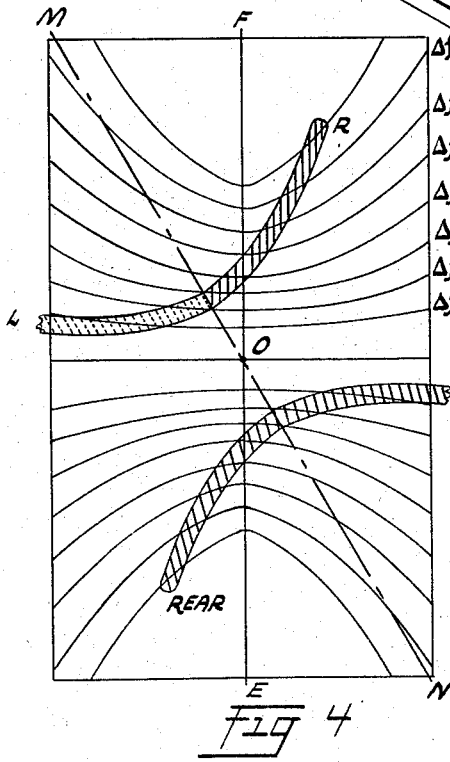
Figure 4 is a geometrical representation similar to that of Fig. 3, illustrating conditions of drift and showing the relation of the areas on the earth's surface illuminated by the forward and aft antennas when the axis of the antenna system departs from the axis of the theoretical iso-frequency contours, which latter contours are to be considered as symmetrical with the axis of the ground track.
Figure 3:
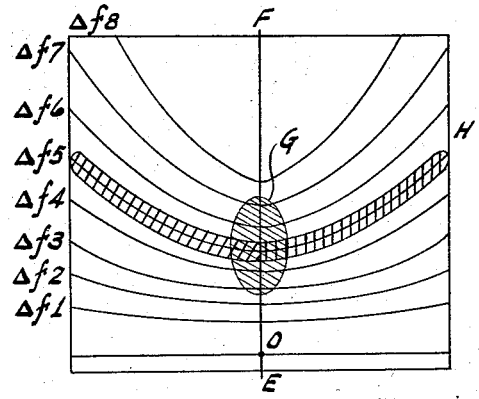
Figure 3 is a geometrical representation of the area of illumination in accordance with the present invention and showing the theoretical iso-frequency Doppler contour lines.

The improvements of the radiating system in accordance with the present invention are graphically illustrated in Figs. 3 and 4 where the point O is the point on the earth's surface directly beneath the aircraft and the line EF represents a projection on the earth's surface of a velocity vector in the direction in which the aircraft is traveling but not necessarily the exact heading of the aircraft as will be better understood from subsequent description. The family of hyperbolae representing iso-frequency contours are indicated as $\Delta f_1$ to $\Delta f_8$, inclusive, the Doppler frequency increasing as the subscripts increase in numerical value; i.e., $\Delta f_1$ represents the contour of lowest frequencies and $\Delta f_8$ represents contours of the highest frequencies. It will be obvious that since the cone of radiation has a finite thickness the area of its intersection with the earth will be in the general shape of hyperbolae. It will be readily apparent that the spectrum of the return frequencies represented by the cross-hatched area H, where a radiating system made in accordance with the present invention is used, will be much smaller than the spectrum of the reflected frequencies would be if prior art type of a radiating system were used, as represented by the cross-hatched area G which cuts across a large number of the iso-frequency contour lines. In the latter instance the Doppler spectrum would be so wide as to require complicated gating circuits or filters before any useful information could be obtained.

Another very important feature of the present invention is the provision of the forward and aft antenna both of which have the conical radiation pattern S. Referring specifically to Fig. 4 the Doppler frequency contour lines are the same as indicated in Fig. 3. As will be clearly understood from subsequent description the present invention utilizes an antenna system in which the two forward antennae have appropriate shields so that the radiation from the right antenna, for instance, is projected forward and to the right while the radiation pattern from the left antenna is projected forward and to the left of the center of the radiation system. This is represented in Fig. 4 by the two respective cross-hatched areas indicated by L and R. In the condition represented in Fig. 4 the axis MN of the antenna system is oriented to the left with respect to the axes EF representing the direction of movement of the aircraft. In connection with Fig. 4 it is to be noted that the aft antenna has a conical radiation pattern similar to that shown in Fig. 2, it being understood, of course, that in the actual radiation system the upper part of the cone is suppressed by a suitable reflector because it is of no practical value and its existence would represent a loss of radiation. Although the Doppler frequency contour lines toward the rear of the aircraft are not shown in Fig. 3, it is to be understood that the conditions described in connection with the forward antennae are similarly applicable to the aft antenna.

An inspection of Fig. 4 will reveal the fact that if the axis of the radiating system MN departs from the velocity vector (direction of movement EF) of the aircraft, the radiation pattern of the forward antennae is displaced with respect to the theoretical iso-frequency contours which are symmetrical with the velocity vector; and the center, or average, of the Doppler frequency spectrum received by one of the antennas will increase while the center, or average, frequency received by the other forward antenna will decrease. Because of the particular shape of the gain patterns of the antennas the difference between the center or average of the frequency spectra received by the different antennae changes rapidly resulting in a very sensitive system.

As has been mentioned previously, the present system includes means for continuously reorienting the axis of the antenna system so that the actual deviations of the axis of the antenna system from the velocity vector are extremely small.

Figure 5:
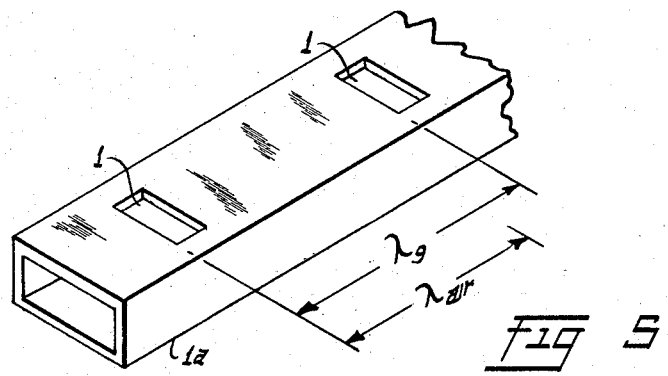
Figures 5, 6 and 7 are perspective views illustrating the different types of antennas which might be used in connection with the present invention to produce the desired radiation pattern.
Figure 6:
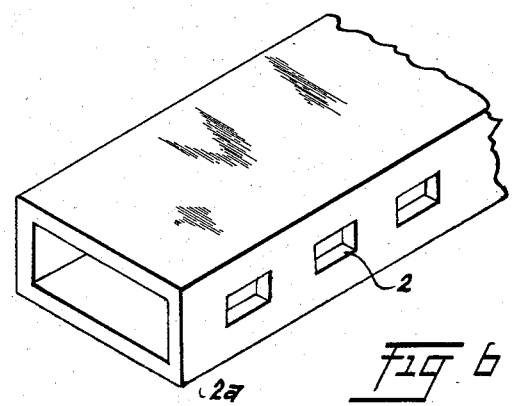
Figure 7:
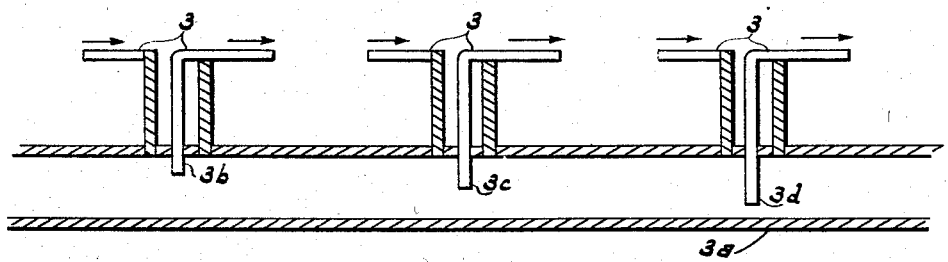

The general type of antenna arrays which may be used in the radiation system of the present invention is illustrated graphically in Figs. 5, 6 and 7. In general, the antenna arrays comprise a series of radiating elements spaced regularly along a straight line, each being energized at a fixed phase relationship. At microwave frequencies, by taking advantage of the difference in velocity between the propagation of microwave energy in a wave guide and in free space it is possible to provide an antenna array which produces a generally hollow radiation pattern of the type previously referred to in connection with Fig. 2 and subsequent figures. In general, the type of antenna arrays utilized in accordance with the present invention comprise a series of radiating elements which may be in the form of slots 1 and 2 as shown in Figs. 6 and 7 or suitable dipoles as shown in Fig. 7. In each instance, the radiating elements are energized by suitable wave guides $1_a$, $2_a$ and $3_a$, respectively. The slot radiators, per se, are conventional and well-known in the prior art. It is the particular arrangement of the radiators and their relative association which constitutes an essential element of the present invention. The fact that the velocity of microwave transmission is greater in a wave guide than it is in the free air, makes it possible to control the relative phase between the radiating elements in order to accomplish the results of the present invention. In the type of the antenna array shown in Fig. 7 the coupling to the dipoles may be varied from element to element, of coupling being represented by the depth of insertion of the inner ends of the dipoles, $3_b$, $3_c$ and $3_d$ into the wave guide $3_a$. As will be disclosed in greater detail in the subsequent description, preferably each of the antenna arrays is of the collinear type. The phase between the individual radiating elements is such that the conical radiation is produced, which might be characterized as being a combination end-fire and broad-side propagation to produce the pattern having a lower portion which is of conical section. In the actual installation on an aircraft the radiation elements, such as those shown in Fig. 7, are preferably mounted below instead of above the wave guide $3_a$ so that the latter would serve as a partial shield for the upper part of the radiation pattern. Also, as will be revealed in connection with the subsequent description of a practical embodiment, suitable shields are added for the purpose of providing a radiation pattern from the two forward-looking antennas of the general shape indicated in Fig. 4 where the right-handed antenna looks to the right and the left-handed antenna looks to the left, the inner ends of the radiation patterns merging at the central axis of the antenna array.

The theory and description of operation of the type of antenna arrays utilized in accordance with the present invention is set forth at length in copending application Serial No. 49,926, now Patent No. 2,869,117 for Navigation System, filed September 18, 1948, by France B. Berger and William J. Tull assigned to the same assignee as this application and therefore no further explanation here is necessary to a full and complete understanding of the present invention.

Figure 8:
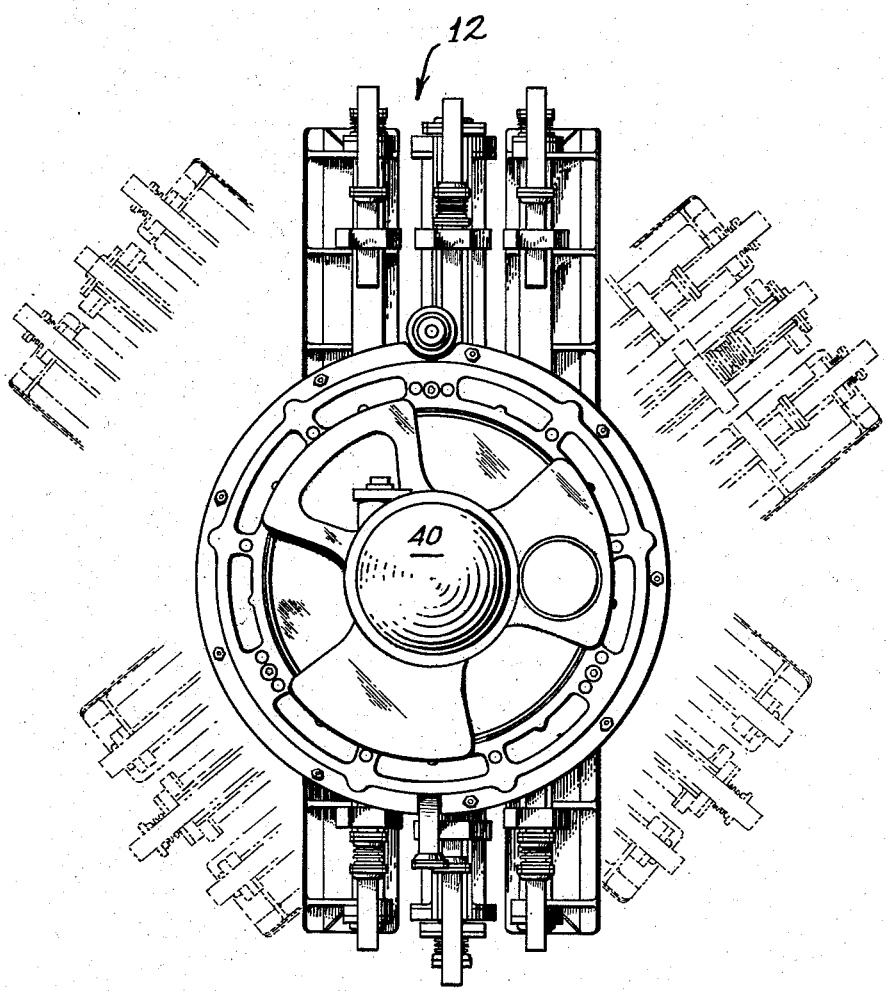
Figure 8 is a plan view of the mount for a practical embodiment of a radiating and receiving system used in accordance with the present invention.
Figure 9:
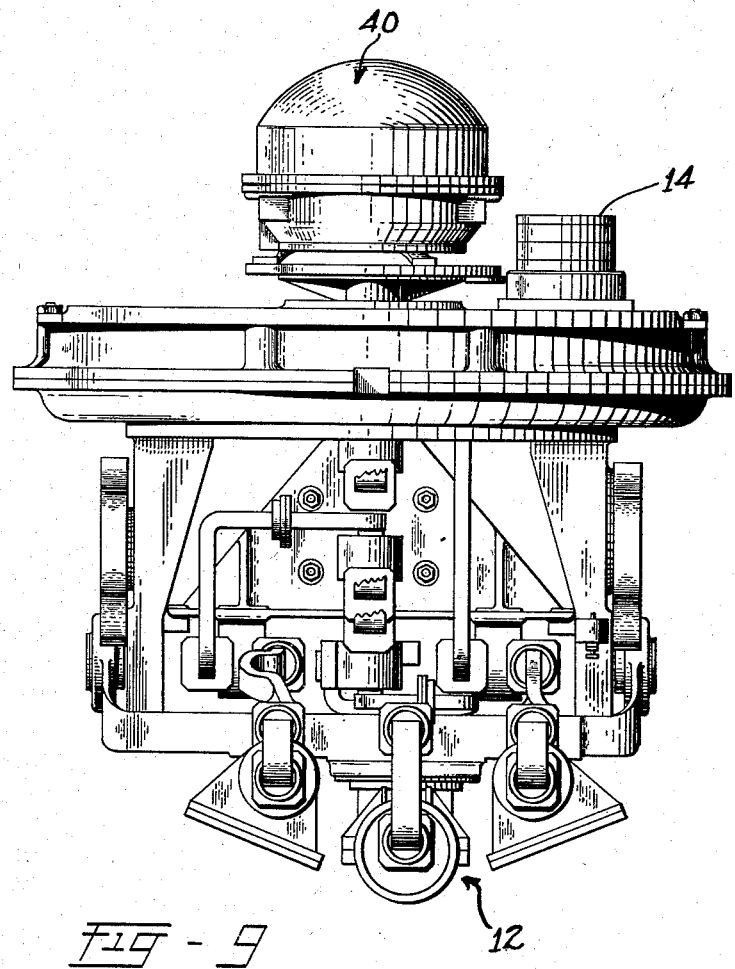
Figure 9 is an end elevational view of Fig. 8.
Figure 10:
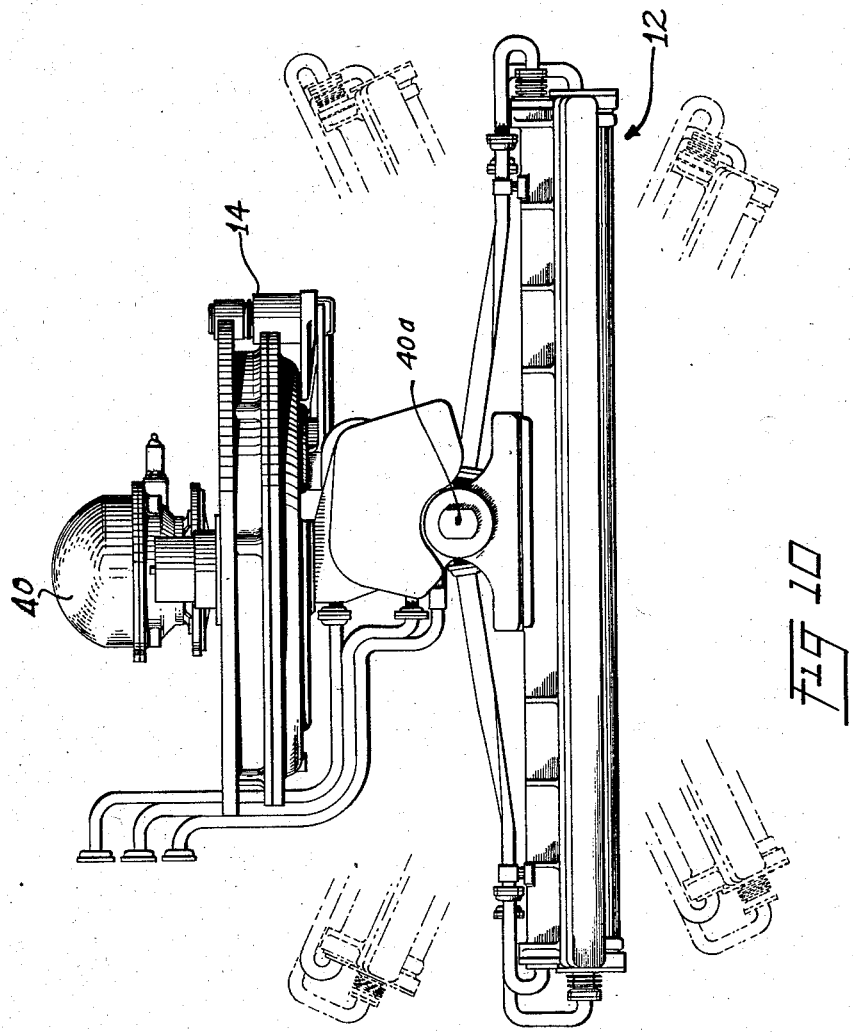
Figure 10 is a side elevational view of Fig. 8, including in dotted outline two alternate extreme positions indicating possible movement to compensate for pitching movements of the aircraft on which it is mounted.
Figure 11:
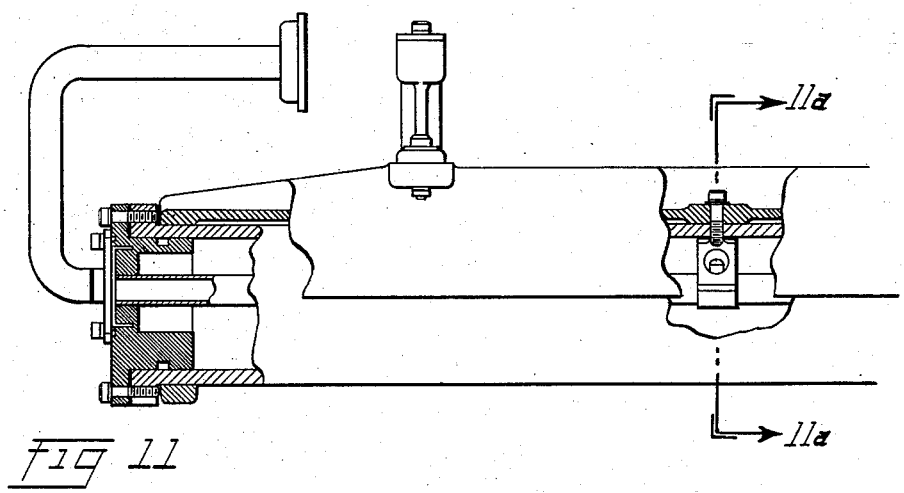
Figure 11 is a partial side elevation of one of the individual antenna arrays, for example, the center array of Figs. 8, 9 and 10 which has its gain characteristic directed toward the rear of the aircraft.
Figure 11A:
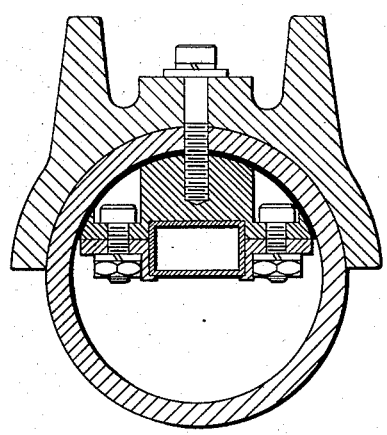
Figure 11a is a sectional view on line 11a—11a of Fig. 11.
Figure 12:
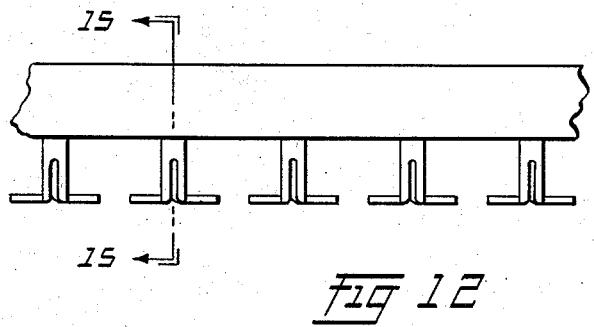
Figure 13:
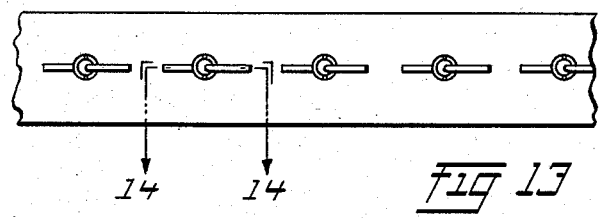
Figure 13 is a bottom plan of Fig. 12.
Figure 14:
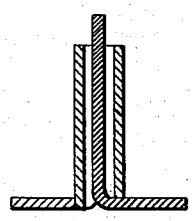
Figure 14 is an enlarged cross-sectional view on line 14—14 of Fig. 13 showing an individual dipole element of the antenna.
Figure 15:
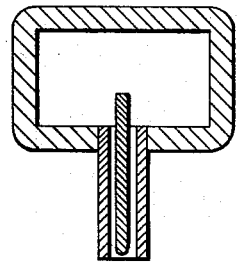
Figure 15 is a partial end section on line 15—15 of Fig. 12 showing the manner in which the individual dipole elements are coupled to the wave guide feeder.

The theoretical conditions which obtain when such an antenna is mounted on an aircraft P in the manner of a practical embodiment of the invention illustrated in Figs. 8, 9 and 10 have been previously discussed.

Figure 16:
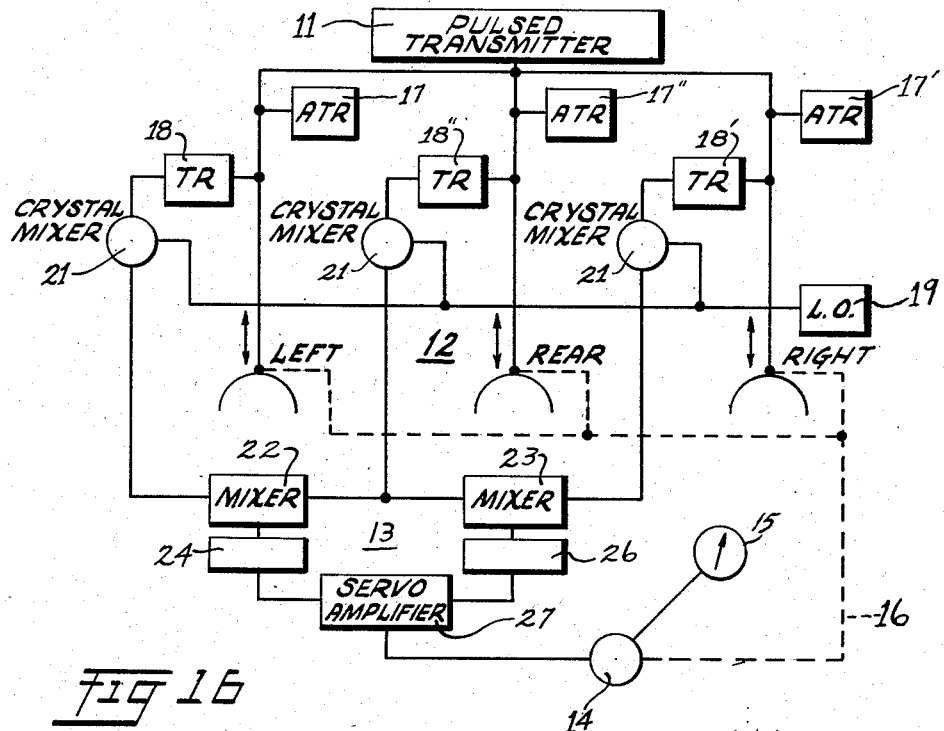
Figure 16 is a diagrammatic illustration of the circuit showing the basic components of the system of the present invention.

A complete embodiment of the present invention is represented diagrammatically in Fig. 16, the larger components of which comprise a pulse modulated-transmitter 11, a suitable antenna assembly of the general type mentioned briefly above and indicated collectively by the reference numeral 12, which has associated with it an appropriate duplexer receiver system comprising the ATR and TR tubes associated with each antenna array and a converting-mixing system 13 for converting the return signals to intelligence in the form of suitable DC energy for energizing a servo motor 14 which, through the mechanical linkage 16, maintains the axis of the radiating system coincident with the velocity vector of the aircraft at all times.

The antenna assembly 12 includes the three parallel linear array antennas 72, 73 and 74 (Fig. 16) and the necessary control facilities for maintaining the arrays horizontal and parallel to the velocity vector of the aircraft P.

As will be apparent from the following description the azimuth-control motor 14 maintains the axis of antenna assembly 12 in very close alignment with the velocity vector C of the aircraft. In fact the alignment is so accurate that the angle between the axis of the antenna system 12 and the lubber line on the aircraft may be used as a determination of the drift angle, which angle is indicated on the indicator 15 driven through a mechanical connection 20 by the motor 14.

The ATR and TR tubes 17, 17', 17" and 18, 18', 18", respectively, commonly used in radar systems where the same antenna array is used for transmitting and receiving in a pulsed system and are employed to route the pulsed signals to and from the antenna assembly 12 to the converting-mixing system 13. Although it is not shown in the schematic diagram in Fig. 16, a suitable circuit is provided for additionally blanking the receiving channel when the transmitter is in operation. A suitable local oscillator 19 is provided for supplying high frequency current which is heterodyned with the receiver input by means of suitable crystal mixers 21 to produce an intermediate frequency which can be conveniently handled by conventional amplifiers. The resultant intermediate beat frequencies produced by the heterodyning of the received signals from the respective antennas and the output of the local oscillator is supplied to suitable mixers 22 and 23, the output from one of the forward-looking antenna and the aft antenna being mixed to provide one spectrum of intermediate frequencies and the output from the other forward-looking antenna and the aft antenna being mixed to provide a different spectrum of frequencies. The two frequency spectra from the respective mixers 22 and 23 are supplied through frequency trackers 24 and 26 respectively, the latter measuring the center of the spectrum of the beat frequencies between the respective frequencies received from the respective laterally directed antennae and the longitudinally directed antenna and converting same to square wave D.C. pulses which are compared in a servo amplifier 27 to control the motor 14 which effects orientation of the antenna system.

Because the axis of the antenna assembly 12 is always maintained in constant alignment with the velocity vector of the aircraft the frequencies received by both the right and left hand antennas will be substatially identical and accordingly the frequencies received by either antenna can be used as an indication of ground speed.

As an illustration to this end, the output from the frequency tracker 24 which includes the Doppler return received by the left hand antenna is supplied through a diode bridge 25 to a D.C. motor 30, which through suitable mechanical connection $30_a$ actuates a ground speed indicator $30_b$. The diode bridge 25 develops a direct current voltage proportional to the input frequency and hence to the velocity of the aircraft. This direct current voltage is compared in a servo amplifier 31 with the direct current voltage taken from the variable arm of a potentiometer 32 and any unbalance of voltage drives the motor 30 to correct the position of the arm of the potentiometer 32. The position of the shaft of the motor 30 and the indicator $30_a$ is then indicative of the aircraft velocity. The operation of the present system is predicated upon the assumption that the antenna system 12 is stabilized against pitch so that the angle of radiation from the aircraft toward he earth in the plane of the velocity vector is always maintained constant. This will be also apparent from the preceding theoretical discussion. Accordingly, a vertical gyro 40 is secured to the mounting of the antenna assembly 12 for the purpose of maintaining an even keel about the axis $40_a$, which will be always transverse to the velocity vector of the aircraft. It is to be understood that this gyro 40 would be operated in conventional manner. Suitable takeoff potentiometers 41 and 42 are provided for controlling the operation of a pitch control motor 43 under the influence of the gyro 40. The potentiometer 41 is operated through the mechanical connection 44 by the motor 43. The motor 43 is energized through a comparison amplifier 45, with the necessary negative feedback being controlled by the potentiometer 42 which is mechanically connected to the antenna assembly mount. The antenna assembly 12 is not roll-stabilized but drift data may be corrected for roll.

Figure 17:
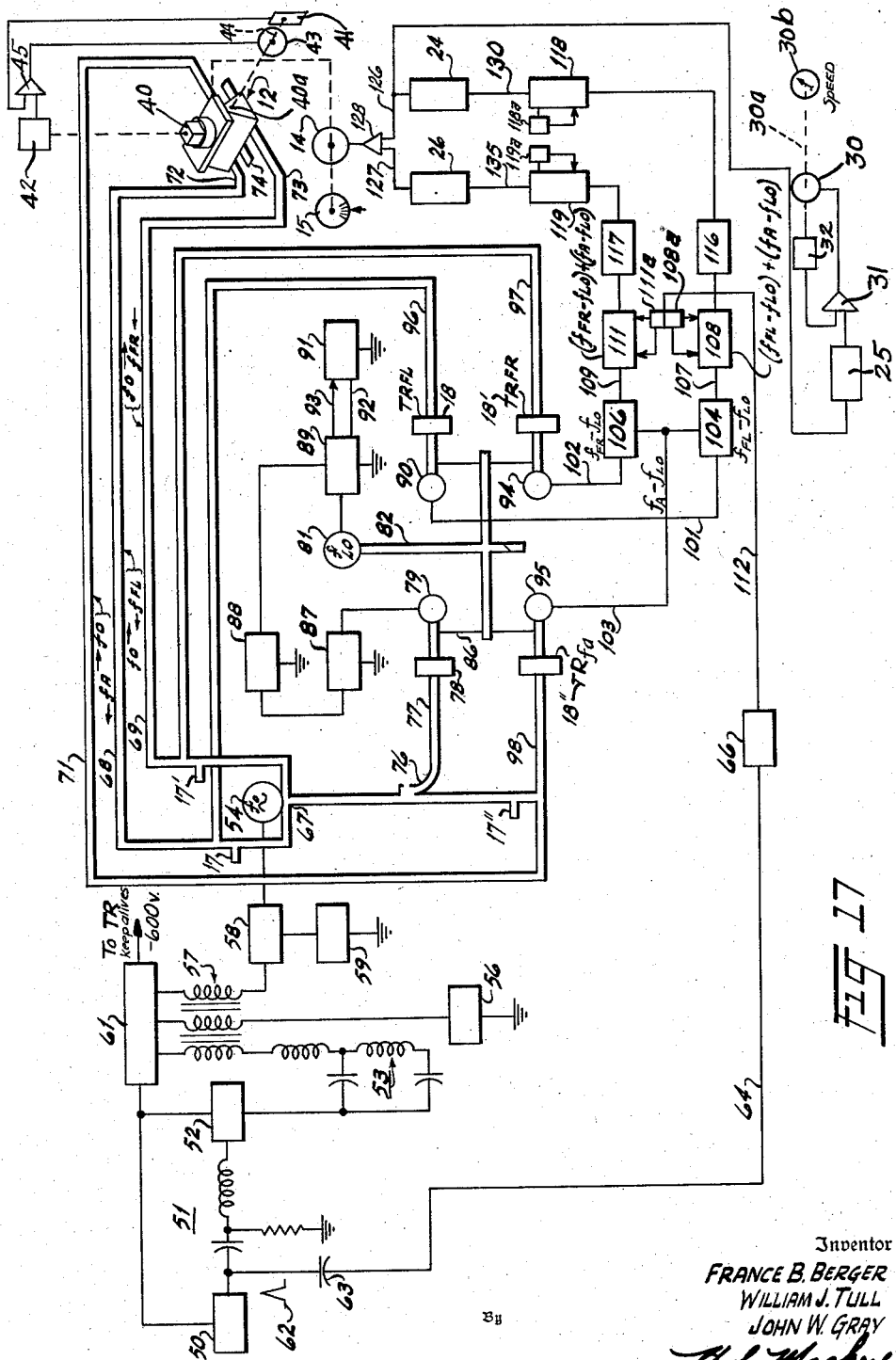
Figure 17 is a schematic illustration primarily in block diagram of the complete system of the present invention.

The block diagram of Fig. 17 illustrates the complete system for measuring speed and drift. For the purpose of simplifying for explanation, the present invention may be described as having major components, such as modulator-transmitter unit, a duplexer-receiver unit and the antenna assembly and drift indicator. One of the novel and salient components is the frequency tracker. Although there are two, one for each side of the aircraft, they are identical in construction and only one is illustrated in detail in subsequent figures.

*Modulator-transmitter*

The modulator-transmitter unit provides the repetition rate of a free running multivibrator 50 which determines the pulse frequency of the system and it is preferably adjusted to operate at a frequency of 50 kilocycles per second. The output from the multivibrator is fed through a delay network 51 and a suitable cathode follower 52 to a pulse forming network 53 for effecting the pulsed radio frequency output from the main transmitter oscillator 54. The main transmitter oscillator 54 is of the magnetron type and in accordance with conventional practice suitable means are provided between the pulse forming network 53 and the oscillator 54 for providing the appropriate high voltage. To this end, a suitable blocking oscillator 56 is inductively coupled through the three-winding transformer 57 to the output of the pulse forming network and with the input of a suitable electronic switch tube 58 which controls the plate voltage from high voltage source 59 to the main transmitter oscillator 54. A low voltage source 61 is provided for supplying the multivibrator 50, the cathode follower 52, and the blocking oscillator 56.

Preferably, the oscillator 54 is operated with reduced field in order to obtain a high duty cycle which is desirable with the present system. The blocking oscillator and the pulse forming network provide a square wave output in the form of pulses which are preferably of the order of 0.1 microsecond in length.

In the practical embodiment described herein for the purpose of illustrating the invention, the main oscillator 54 operates at such a frequency as to give a radio frequency output having a wave length of approximately 3.0 centimeters. The output from the main transmitter oscillator 54 is supplied to the duplexer-receiver unit which routes the radio frequency pulses from the main oscillator 54 to the antenna arrays, and routes the reflected energy received by the antennas to the receiver unit. In connection with the operation of the receiver it is to be noted that the trigger pulse 62 from the multivibrator 50 is fed through coupling condenser 63, conductor 64 and a main bang gating amplifier 66 to the receiver to blank the intermediate frequency amplifier of the receiver system during the transmission of the high frequency pulses.

*Duplexer-receiver*

The trains of output radio frequency pulses from the main oscillator 54 of the modulator-transmitter unit 11, which is operating at a frequency $f_0$, are divided three ways at a magic-T wave guide coupler 67 and are then transmitted separately by wave guides 68, 69 and 71 to respective antenna arrays 72, 73 and 74 of the antenna assembly 12. The detailed construction of the antenna arrays are shown in subsequent figures, principally Figures 11 to 15 inclusive. The magic-T coupler 67 is of the type described and claimed in copending application of John F. Zaleski, Serial No. 76,983, now Patent No. 2,685,065 filed February 17, 1949, and assigned to the same assignee as the instant application. This coupling has very special characteristics and is used for dividing the power at a junction in microwave guides.

In addition to the microwave energy which is supplied to three antenna arrays, a small portion of the output from the oscillator 54 is supplied through a directional coupler 76 and through wave guide branch 77 and a cavity resonator 78 to a crystal mixer 79 where it is beat with the output from a local oscillator 81 and corresponds to the local oscillator 19 of Fig. 16. The frequency of this local oscillator 81 is indicated by the symbol $F_{LO}$. In the preferred embodiment described the difference frequency of the local oscillator 81 and the main oscillator 54 is nominally 30 megacycles per second. The cavity resonator 78 serves as a filter to bypass a very narrow frequency spectrum centered on the frequency $f_0$ of the oscillator 54.

The local oscillator 81 is coupled through appropriate wave guide 82 which is provided with divided branches, one of which is coupled with the wave guide 77, the line 86 designating the coupling means which may take the form of a slot common to juxtaposed overlapped side walls of the wave guides at their points of junction. The difference frequency $f_0-f_{LO}$, which is nominally 30 megacycles per second, constituting the output of crystal mixer 79 is supplied through the I.F. amplifier 87 to a discriminator amplifier 88, the output of which is an error voltage which is supplied to a D.-C. amplifier 89 the output of which controls the sweeping frequency of the local oscillator 81. This oscillator 81 is of the klystron type and the output from the amplifier 89 regulates the reflector voltage in accordance with conventional practice to provide a constant frequency difference between the main transmitter oscillator 54 and the local oscillator 81. A suitable sweep generator 91 supplies a varying sweep voltage through connection 92 to the D.-C. amplifier 89 for the purpose of causing the local oscillator 81 to continuously sweep through a definite frequency range on either side of the desired intermediate frequency. When a D.-C. error voltage is applied to the D.-C. amplifier 89 by the discriminator amplifier 88 the D.-C. amplifier 89 supplies a sweep disabling voltage through connection 93 to the sweep generator 91 thus stopping the voltage sweep at the proper value to give the necessary correction to the local oscillator 81.

From the circuit diagram of Fig. 17 it will be clearly seen that the controlled frequency from the local oscillator 81 is mixed through crystal mixers 90, 94 and 95 with the reflected frequencies received through the TR tubes TR$fl$, TR$fr$ and TR$fa$ (18, 18' and 18", respectively) which are, respectively, coupled through suitable wave guides, 96, 97 and 98, respectively, to the left-hand forward looking antenna 72, the right-hand forward looking antenna 73 and the aft antenna 74. Consequently, the Doppler-shifted radio frequency signals received by the forward looking antennas 72, 73 and the aft antenna 74 will be mixed with the frequencies of the local oscillator 81 through the respective crystal mixers 90, 94 and 95 to provide three separate intermediate frequency output signals $f_{FL}-f_{LO}$, $f_{FR}-f_{LO}$ and $f_A-f_{LO}$. These frequencies are supplied through the respective connections 101, 102 and 103 to additional mixers 104 and 106, the signals on connections 101 and 103 being mixed in mixer 104, and the signals on connections 102 and 103 being mixed in mixer 106. This action provides an addition intermediate frequency signal on an output connection 107 to I.F. amplifier 108 and a separate addition frequency on connection 109 which is supplied to the input of an I.F. amplifier 111. These latter amplifiers are provided with respective automatic volume control units 108a and 111a for limiting the maximum outputs from the respective amplifiers. The output from the main bank gating amplifier 66 is supplied through connection 112 to the A.V.C. units 108a and 111a for the purpose of blanking the respective amplifiers 108 and 111, one microsecond before a pulse of radio frequency energy is transmitted by the main oscillator 54 thus reducing to a minimum the affects of any TR tube leakage during the operation of the transmitter and precluding pickup from the modulator.

It will be seen that the radio frequency signals received from the forward looking antennas will be slightly higher than the frequency of the transmitted signals from the main oscillator 54 and that the signals received from the aft antenna will be slightly lower on account of the Doppler effect. It will be noted that the signals from the aft antenna are mixed independently with the signals from the forward looking antennas thus giving radio frequency signals having an audio modulation at a frequency which is the algebraic sum of the respective signals received by the forward looking antennas and the aft looking antenna. These respective intermediate frequencies are $(f_{FR}-f_{LO})+(f_A-f_{LO})$ supplied to amplifier 111 and $(f_{FL}-f_{LO})+(f_A-f_{LO})$ supplied to amplifier 108. These signals are then amplified at intermediate frequencies, detected in detectors 116, 117 and then amplified as audio signals in the two audio amplifiers 118, 119 providing outputs which are supplied through connections 130 and 135 to frequency trackers 24 and 26, respectively. The audio amplifiers 118, 119 are provided with automatic volume control units 118a, 119a, respectively. The frequency trackers 24, 26 measure the center of the Doppler spectrum. It is to be noted that although a pulsed system is used, there is no coherent oscillator and there is no primary oscillator in operation at the time of the return signals but nevertheless, a very accurate reference is provided by the return signal received by the aft antenna because the reflected signals received by the aft antenna have their origin in the original signal which is transmitted simultaneously, and exactly in phase with, the signals transmitted from the forward looking antennae.

The outputs from the frequency trackers 24 and 26 are square wave voltage pulses having respective frequencies equal to the beats between the differences between the local oscillator and the return frequencies received by the aft antenna and the respective forward antennae. As will more readily appear from the subsequent detailed description of the frequency trackers, when the axis of the antenna system departs from the velocity vector (or ground track) polarized error signals and through an amplifier 128 to the azimuth servo motor 14 which rotates the antenna assembly 12 about a vertical axis until the axis of the antenna assembly and the ground track again coincide. Since this servo system is very sensitive the axis of the antenna system and the ground track will be very close to coincidence at all times and accordingly, the received signal from either of the forward looking antennas can be compared with the signals from the aft antenna in order to provide the error servo signal for motor 14. The above operation is based on the assumption that the antenna assembly 12 is maintained on an even keel in the manner previously described.

The frequency trackers

The function of the frequency trackers is to produce a voltage wave of constant amplitude whose output frequency is proportional to the average of the Doppler spectrum, that is, the center of the area of a curve of voltage versus frequency on a linear scale. As has been previously pointed out, in the present system the area of the earth illuminated by the radiation pattern of the antennas is continuously changing so that for any two successive intervals the instantaneously illuminated area overlaps a portion of the area which was illuminated an instant before, etc. Therefore, it will readily be seen that the section of the illuminated area changes from instant to instant and under certain conditions there may be instants during which there will be no usable echo because of the characteristics of the particular terrain being illuminated at any one instant and consequently at such instant there will be no "average" Doppler frequency. One of the important features of the present Doppler frequency tracker is that it will "remember" the average frequency of the instant before and will continue to supply a direct current signal proportional to this frequency to the servomechanism which controls the antenna assembly 12 until a subsequent Doppler frequency signal is received. Since the level of the reflected wave signal energy received by the antennas will continuously vary, the frequency trackers 24, 26 in effect interpolate between the points on a time-energy level curve and measure the average energy level.

Figure 18 illustrates in block diagram the circuit of the frequency trackers, the details of which are shown in the schematic diagram of composite Figure 19. Referring specifically to Fig. 18, each of the frequency trackers comprises a mixer modulator 140 in which the Doppler frequency spectra from line 130, for example (see Fig. 17), is mixed with the output of a local oscillator 141. Although it will be readily apparent that there is a rather wide range of frequencies which might be employed, preferably the frequency of the local oscillator 141 is so chosen that the difference between its frequency and that of the Doppler frequency will be 20 kilocycles, it being necessary only that the oscillator frequency be higher than the maximum input frequencies. This difference frequency is supplied through line 142 to a 20-kilocycle discriminator 143. The output of this discriminator 143 is supplied through a connection 144 to a suitable servoamplifier 145 the output of which is supplied alternately through a switch 152 and connections 146 and 147 to servomotors 148 and 149, respectively. The servoamplifier 145 is provided with an integrating network comprising the resistor 145a and capacitor 145b. This integrating network is an essential part of the frequency tracker because it enables the servoamplifier 145 to very closely approximate a running average of the input even though the input may vary erratically over a period of seconds. This network constitutes a feedback or "memory circuit" which effectively interpolates or averages the instantaneous reflected energy causing the servoamplifier 145 to deliver an output signal which is proportional to the center of the Doppler spectrum. A resistor 145c serves as a stabilizing element, to reduce any tendency of the network to oscillate.

For reasons which will readily appear hereinafter, the output from the servoamplifier 145 is alternately supplied to the two motors 148, 149 by means of the double throw switch 152, which is preferably controlled by the output of an independent free-running multivibrator (not shown). The motor 148 operates a voltage divider 153 by means of a mechanical connection 154. The voltage divider 153 controls the voltage supplied to the local oscillator 141 for controlling the frequency thereof. Preferably the local oscillator 141 is of a type such that its frequency is a linear function of a D.-C. control potential, such as that supplied from the voltage divider 153. The motor 149 is connected to the potential divider 156 through the mechanical connection 157 and the voltage divider 156 varies the voltage supplied to a second local oscillator 158. The voltage divider 153 constitutes the primary control for the local oscillators 141 and 158 and under automatic control maintains the frequency of the local oscillator 141 at 20 k.c. above the Doppler input frequency.

The frequency of the signals generated by the oscillators 141 and 158 are varied substantially in unison but at frequencies 20 k.c. apart under the primary control of the voltage divider 153. The resistors $R_1$ and $R_2$ are connected in series between the sliders of the potential dividers 153 and 156, the resistance of resistor $R_2$ being 10 to 20 times larger than $R_1$ so that the potential supplied through $R_1$ provides the primary control and the vernier control can be supplied through the resistor $R_2$. Because of the ratio of the values of the resistors $R_1$ and $R_2$ any adjustment of the contact arm of the potential divider 153 varies the potential of the lower end of the resistor $R_1$ and hence the potential applied to the oscillator 159 is varied by a proportional amount.

The local oscillator 158 provides an output signal having at any instant of time only a single frequency which corresponds exactly to the center of the band of input frequencies from the conductor 130 so that at the output conductor 126 a controlled signal is provided which is free of noise and is limited to a single varying frequency rather than a band of frequencies. To this end, the frequency of oscillator 158 must be maintained exactly 20 k.c. below the frequency of oscillator 141, the frequency of the latter being controlled as previously described by the mixer-modulator 140, the discriminator 143, the servoamplifier 145, the motor 148 and the potential divider 153 to generate a signal of a frequency which is exactly 20 k.c. above the center frequency of the spectrum of input frequencies at the conductor 130. In other words, the oscillator 158 generates a frequency equal to the center frequency on conductor 130.

Although the primary control for the oscillator 141 is provided by the adjustment of the potential divider 153 which also adjusts the frequency of the oscillator 158, the characteristics of the oscillators cannot be made so nearly identical as to track each at exactly 20 kc. apart over the necessary wide range of frequencies. Therefore, in order to insure that the output frequency of the oscillator 158 is exactly the same as the center frequency of the spectrum of input signals on the conductor 130 an auxiliary or vernier control of the oscillator 158 is provided by the potentiometer 156 which is periodically reset by intermittently energizing the motor 149 from the output of the servo-amplifier 145.

The switches 168 and 152 are mechanically interconnected by the mechanical connection 171 to operate in unison. The switches are in the position shown in Fig. 18 for a period of 36 seconds out of a 40-second interval after which they are moved to the alternate position for a four-second interval. In the position shown in Fig. 18 the input signals from the conductor 130 are mixed in the mixer-modulator 140 with the signal generated by the oscillator 141 to produce the 20 kc. beat frequency which is supplied to the discriminator 143 as previously described. When this beat frequency is exactly 20 kc. the discriminator output is zero and the arm of the potential divider 153 remains stationary. Then if, for any reason, the center frequency of the input signal spectrum on the conductor 130 changes its instantaneous value the frequency applied to the discriminator 143 will change and a signal of the appropriate sense in direct linear relation to the variation in frequency of the input signal will be produced causing the amplifier 145 to energize the motor 148 to adjust the potentiometer 153 and thus apply a control voltage to the oscillator 141 to make the output from the mixer-modulator 140 exactly 20 kc. Thus regardless of the center frequency of the input signal spectrum on the conductor 130, the oscillator 141 is made to track therewith at a frequency exactly 20 kc. The oscillator 158 is made to track with the oscillator 141 at a frequency of 20 kc. below the latter so that it follows exactly the center of the signal frequency on the conductor 130.

In order to eliminate any possible drift between the tracking of the oscillators 141 and 158 due to variation in circuit parameters or voltages, the switches 162 and 152 are periodically actuated in unison in any suitable manner as by means of a multivibrator or the like in such manner that simultaneously with the movement of the switch 162 from the input conductor 130 to the output conductor 126 the switch 152 will be disconnected from the connector 146 and will be connected to the conductor 147 through which motor 149 is energized. The cycle for such operations may be 36 seconds in the position shown in Fig. 18 and 4 seconds in the alternate position.

In the latter alternate position the output from the oscillator 158 is substituted for the spectrum of input signal frequencies on the conductor 130 as the input to the mixer-modulator 140 and the output of the servo-amplifier 145 is connected to the motor 149 to operate the vernier control for the oscillator 158 which vernier control is represented by the potentiometer 156. If at the time of the operation of the switches 162 and 152 to their alternate positions the output frequency of the oscillator 158 does not correspond exactly to the center of the spectrum of the signals on the conductor 130 at the instant before the switches are operated the difference frequency between signals of the oscillator 141 and 158 will not be exactly 20 kc. and any departure therefrom will produce an output signal from the discriminator 143 which, through the servo-amplifier 145, will energize the motor 149 and vary the slider of the voltage divider 156 in the manner described to adjust the frequency of the signal generated by the oscillator 158 until the output from the 20 kc. discriminator 143 is again zero thus causing the frequency of the oscillator 158 to correspond exactly to the instantaneous center of the frequency spectrum on the conductor 130 at the instant before the switches 152 and 162 were operated.

It will be readily apparent that the Doppler frequency will change with speeds of the aircraft and it is desired that this frequency always be within the linear part of the discriminator curve for all speeds of the aircraft. Since the spectrum width at any instant is a constant percentage of its frequency and thus is proportional to the frequency, it is necessary that the fixed discriminator 143 have a characteristic curve of width proportional to the Doppler frequency and have a Q inversely proportional thereto. This control is not critical and it may be accomplished by means of variable resistors (not shown in Fig. 18) controlled along with the primary control voltage divider 153. Accordingly, the motor 148, through the connection 166 controls such a potential divider (not shown).

It is to be expected that in a system such as the present the apparent Doppler frequency input will be somewhat erratic so that the error signal produced by the frequency trackers 24, 26 will be subject to rapid variations to which the motor 148 should not respond. On the other hand, the frequency trackers should not saturate and should linearly store all the error fluctuations and cause more gradual control of the motors so that the average error will be substantially zero. This is accomplished by providing an integrating control previously mentioned as a part of the servoamplifier 145.

The integrating network comprising the resistor 145a and the capacitor 145b constitutes a feedback circuit for impressing a portion of the output back into the input of the high gain amplifier 145. The phase of the electrical output from the amplifier 145 is such that it opposes any change in value of the signal arriving at the input of the amplifier. The amplifier 145 is of the direct current type and has such an extremely high gain over its range of operation that the voltage at its input remains substantially zero because of the feedback action. Also, the effective time constant is very high since it contains as a factor the amplifier gain, so that the output voltage level may remain substantially contant for an indefinite period of time should the level of the input signal on conductor 130 drop below the threshold value.

The position servo-mechanism loop, described above, including the mixer-modulator 140, the discriminator 143, the servo amplifier 145 and its associated integrating network, the motor 148, the potential divider 153 and the oscillator 141, provides an output signal at conductor 126 having a frequency equal to the instantaneous center of the spectrum of the input signal above the threshold value on conductor 130, or in the event the value of the input signal on conductor 130 falls below the threshold value, then the instantaneous center frequency at the instant next preceding the instant at which the input signal on the conductor fell below the threshold value. This latter action may be likened to a memory faculty as the system "remembers" for an indefinite length of time in case of the absence of a usable input signal on conductor 130. In the latter instance, only noise energy is applied to the discriminator 143 so that its output is zero, thus causing the motor 148 and potetnial divider 153 to remain stationary with the oscillators 141 and 158 continuing to operate at respective constant frequencies. Regardless of whether or not there is a usable input signal on conductor 130, the switches 152 and 162 continue to be operated independently to periodically substitute the motor 149, the potential divider 156 and oscillator 158 for respectively, the motor 148, potential divider 153 and the oscillator 141, in the discriminator position servo-mechanism loop to correct any drift of the oscillator 158 away from the 20 kc. frequency interval normally separating the two oscillators, in the manner detailed above.

Referring specifically to Fig. 19, the details of the illustrative example of the frequency trackers 24, 26 are shown. The local oscillator designated by the numeral 141 in the block diagram of Fig. 18 comprises electronic discharge tubes 200, 201, 203 and 204 which are associated in a free-running multivibrator circuit. The discharge tubes 200 and 201 are connected in a conventional multivibrator circuit and the control tubes 203 and 204 assure that the local oscillator will always start into oscillation without having to initiate their operation by the use of a manual switch. The discharge tubes 200 and 201 are shown in the specific embodiment as pentodes but it will be readily appreciated that triodes may be used. Also the discharge tube 203 is shown as a duo-triode but instead two separate triodes could be used.

This multivibrator circuit is shown and claimed in copending application of John W. Gray, Serial No. 169,971, now Patent No. 2,653,242 filed June 23, 1950, assigned to the same assignee as the instant application and accordingly it is believed that only a general description is necessary herein. The cathodes 206 and 207 are connected to an electrically common point such as ground indicated at 208. The respective control grids 209 and 211 are connected through resistances 212 and 213 of equal capacity to a common connection 214 which may be one side of a control voltage which is used to control the frequency of the local oscillator. In accordance with conventional practices the grid 209 of the tube 200 is connected by means of a suitable coupling condenser 216 to the anode 219 of the tube 201 and similarly, the control grid 211 of the tube 201 is connected by a coupling condenser 218 to the anode 217 of the tube 200. A suitable positive potential is supplied to the anodes 217 and 219 from the positive lead S4 through a common resistor 221 and respective resistors 222 and 223. The respective screen grids 226 and 227 are energized from the positive potential source S4 through common resistor 228. The output from the multivibrator circuit is through connection 224.

The elements mentioned immediately above constitute the conventional part of a multivibrator circuit for which the tubes 203 and 204 constitute a novel control system which assures that the multivibrator circuit will always start in its oscillation as soon as the power is connected to it. Also the tubes 203 and 204 constitute a novel limiting circuit for maintaining the alternating peak-to-peak potential output at a constant value. This latter feature is extremely important in the system of the present invention. The maximum peak voltage is determined by the breakdown potential of tube 204. It is very desirable to limit the rise of the anode voltage to the steepest parts of the exponential curves to produce a more nearly rectangular output. To do this the respective sections of the tube 203 serve as "plate catchers." The alternating peak-to-peak potential is determined by the potential of the point P at which the respective cathodes 230 and 231 are connected in common, the positive peak being determined by reason of the limiting action of the respective sections of the tube 203 while the negative peak potential is fixed at a specific amount above the ground depending upon the voltage drop during the maximum anode current flow through the anode resistor 232.

As is clearly evident from the drawing, the control grid 234 is connected to the anode 217 and the control grid 236 is connected to the anode 219. The two anodes 237 and 238 are connected to the positive high voltage supply S4 through the resistor 232. Associated with the limiter tube 203 is the neon tube 204 which is connected directly across the common cathode terminal for cathodes 230, 231 and the common anode terminal 237, 238. A suitable condenser 239 which is connected between the terminal common to one of the electrodes of the neon tube and the anodes 237 and 238 and the control grid 209, causes the neon tube 204 to operate as a relaxation oscillator to provide the necessary pulse to initiate the operation of the multivibrator when power is applied. As is well known it is entirely possible that when a multivibrator of the free-running type is first turned on it may be in such condiiton that full current flows through both of the tubes, such as tubes 200 and 201, causing the potential of both of the anodes to be at the same potential thus causing the tubes to remain in static condition until some voltage pulse causes the initiation of a regenerative interaction between the tubes to start oscillation.

In the present system the neon tube 204, the condenser 239 and the associated circuit constituting a relaxation oscillator which causes potential surges or pulses to be automatically applied to the multivibrator (tubes 200, 201) until it commences to oscillate at which time the relaxation oscillator becomes inactive. Assuming that the power is applied to the local oscillator 141 causing a charge to build up between the two electrodes of the neon tube 204, it will be apparent from the circuit diagram that as soon as the voltage is applied from the terminal S4 the neon tube 204 and the condenser 239 will begin to store a charge. As soon as the charge on the neon tube 204 reaches the break-down voltage this tube will discharge through the condenser 239 and the resistor 212. This cycle will again be repeated after the condenser 239 is recharged and the potential across the electrodes of the neon tube 204 again reaches the ignition potential, the value of the capacitor 239 and the resistor 212 determining the frequency of oscillation. The discharge of the condenser 239 will be to ground through a low impedance circuit including the path between the control grid 209 and the grounded cathode 206. This causes the potential across the neon tube 204 to fall abruptly below its extinction potential. The neon tube 204 will then again commence to recharge at a rate depending upon the values of the resistance and capacitance in the circuit. This process will be repeated until the multivibrator starts into oscillation. The oscillation of the neon tube 204 produces abrupt negative voltage pulses of approximately 20 volts which will be impressed upon the control grid 209 causing a decrease in anode current through tube 200. This pulse is regeneratively supplied through the coupling condenser 218 to the grid 211 of the tube 201 thus starting the multivibrator oscillations. As soon as the multivibrator starts into oscillation either the tube 200 or the tube 201 will alternately draw anode current thereby causing the respective anodes 217 and 219 to be near the potential of the point P causing the associated triode section of the tube 203 to draw anode current thus maintaining the voltage across electrodes of the neon tube 204 below the ignition potential. Thus the neon tube 204 is automatically held out of operation and has no effect whatever upon the multivibrator operation.

The output from the multivibrator at the connection 224 is supplied through a coupling condenser 241 to a suitable amplifier 242. This amplifier comprises discharge tubes 243 and 244. As is apparent from Fig. 19, the tube 243 has a cathode follower output at point 246 and a plate output at 247, these two points providing a pushpull output which is supplied to the dual triode 244. The output from point 246 is supplied through a coupling condenser 248 to the first control grid 249 of the tube 244 and the output from point 247 is supplied through coupling condenser 251 to a second grid 252 of the tube 244.

Tube 244 is operated as a cathode follower and delivers pushpull output at points 253 and 254. This pushpull output is supplied to a special two-stage double diode mixer-modulator 260 which, because of its design, has very special characteristics and whereby the opposite ends of the modulation transformer are alternately clamped at substantially ground potential. One of the advantages of the design is that the output from this mixer-modulator includes only the difference frequency and the third and higher harmonics thereof. It will be noted from the circuit diagram that the point 253 on the tube 244 is coupled by means of coupling condensers 261 and 262, respectively, to the cathode 263 of one section of the duodiode 264 and through the coupling condenser 262 is connected to the anode 266 of the other section of the duodiode 264. The point 254 on tube 244 is connected through coupling condensers 267 and 268 respectively to the cathode 269 of one section of the duodiode 271 and to the anode 272 of the other section of the duodiode 271. The anode 273 of the duodiode 271 and the cathode 274 of the duodiode 264 are connected to one side of center tap winding 276 of modulation transformer 277. The other end of winding 276 is connected to cathode 278 of the duodiode 271 and to the anode 279 of the duodiode 264. The winding 276 is provided with a center tap 281 and a resistor 282 is connected between the center tap and one end of the winding 276 and resistor 283 is connected between the opposite end of this winding and the center tap 281. The primary winding 286 of the modulation transformer 277 is coupled by means of a coupling condenser 287 to point 289 which is the cathode follower output terminal of a duodiode amplifier tube 291. The anode 272 of tube 271 is connected to the ground through resistor 292 and the cathode 263 of tube 264 is connected through ground to resistor 293. The cathode 269 of tube 271 is connected through a resistor 294 and a portion of the potential divider 296 to ground the other portion of the potential divider 296 being in series with a resistor 297, the other end of which is connected to the anode 266 of tube 264. The connections just described and the associated duodiodes 264 and 271 constitute a rectifier bridge circuit which applies the pushpull output from the amplifier 242 which is the amplifier output of the local oscillator previously described to the modulation transformer 277. The action of the mixer-modulator 260 is to provide at the point 289 on an amplifier tube 291 the modulation output resulting from the mixing of the Doppler input signal and the output of the local oscillator.

The Doppler frequency input from the conductor 130 as described in connection with Fig. 18 is connected through a suitably shielded conductor 300 to a potentiometer 301 to the first control grid 302 of the mixer-duotriode 291. The output of the first section of the tube 291 is supplied through suitable coupling condenser 295 through suitable switch relay contacts X₄ and X₆ to the second control grid 303 of the duotriode 291. The latter section of the duotriode 291 is connected as a cathode follower and its output terminal so that the terminal 289 is connected through the coupling condenser 287 to the winding 286 of the modulation transformer 277. The modulated output of the modulator is supplied from the center tap 281 through a suitable variable decoupling resistor 304 to the input of a special frequency discriminator 143, the output of which is suitably integrated and alternately supplied to servomotors 148 and 149, the functions of which are described in connection with Fig. 18.

As has been mentioned previously among the essential features of the present invention is the provision of sub-components which cooperate in a manner to provide an accuracy within tolerances heretofore not obtained. Among the essential features is the provision of circuits which are capable of utilizing a signal when the signal-to-noise ratio is very small. It necessarily follows that this type of system is not readily vulnerable to jamming by any signal other than that one for which the circuits happen to be tuned at the instant and which varies from instant to instant. One of the major contributions in this respect is the special frequency discriminator circuit 143 which has an extremely narrow bypass band.

The discriminator 143 comprises a parallel tuning circuit including an inductance 307 and condenser 308. The usual trimming condenser 309 is provided for making vernier adjustments. The parallel tuned circuit constitutes a rejector circuit which has maximum impedance at 20 kilocycles which is the frequency intended to be passed by the discriminator, the discriminator putting out an error signal if the frequency impressed upon the discriminator input varies appreciably therefrom. Since the Doppler frequency spectrum width is a fixed percentage of its center frequency and since the value of the resistor 304 determines the bandwidth of the rejector circuit this resistor is adjusted by means of a mechanical coupling (not shown) to the main tracking servo. The gain of this rejector circuit rises as the decoupling resistor 304 is lowered. Through a suitable coupling condenser 311 the rejector circuit of the discriminator is coupled through an impedance matching device which in the embodiment shown includes a discharge tube 312 connected to operate as a cathode follower. The cathode follower output at point 313 is connected through suitable coupling condenser 314 to another tuned circuit including reactance 316 and condenser 317, the suitable trimming condensers 318 being provided to supplement the condenser 317 for the purpose of providing vernier control. The coupling condenser 321 is of special size to have a small reactance as compared to the inductance of the coil 316 at the resonant frequency. When a signal is supplied to the rejector circuit at the point 305 if the signal has a frequency at which the rejector circuit is tuned the rejector will present high impedance thereby providing a maximum voltage drop between the point 305 and ground. This supplies a maximum signal to the input of the tube 312 thereby developing maximum output at point 313 which is impressed on the center tap 310 of the coil 316. The filter circuit of which coil 316 is a component is tuned to 20 kc. and is shunted by a variable resistor 322 of approximately the same value as the resistor 304. By virtue of the coupling to the center tap 310 of the coil 316 the outer terminals 322a and 322b will have equal input signal potentials. By reason of the coupling condenser 321 the inductance 316 operates as an auto transformer causing an induced voltage to be generated across the two ends of the coils 316 which is in quadrature with the signal voltage supplied at the center tap 310 with the neutral point at the center tap. Accordingly, this quadrature voltage is added to the signal voltage at the center tap 310 and the potential at one of the terminals 322a, 322b leads and the other lags the reference signal voltage at the point 310. The resultant signal potentials at terminals 322a and 322b are the respective algebraic sums of the input signal potential at point 310 and the respective leading and lagging voltages. The input signal potential which is capacity coupled to the center tap 310, decreases as the shunting resistance is lowered so that the overall discriminator gain at resonance is essentially independent of the Q of the circuit.

Discriminator action is obtained by reason of the fact that at the 20 kc. resonant frequency the tuned circuit including the coil 316, and the condensers 317 presents only resistance resulting in the resultant potentials at 322a and 322b being 90° apart while the phase angle will change in sense and magnitude depending upon departure from the resonant frequency.

The resistor 322 may be varied in unison with the value of the resistor 304 by controlling their associated commutators by the main servomotor 148 through a mechanical connection (not shown) so that the Q's of the respective circuits may be varied inversely relative to the input signal frequency.

For purposes of convenience and in order to make the circut diagrams easier to read, Fig. 19 has been made in composite form in order to avoid excessive crossing of lines.

The outputs between the point 322a and ground and between the terminal 322b and ground are applied to the respective amplifiers 326 and 327. The amplifier discharge tube 326 is coupled in a conventional manner to amplifier discharge tube 328 and the output of discharge tube 327 is similarly connected in conventional manner to amplifier tube 329. Suitable negative feedback networks 331 and 332, are provided to stabilize the respective amplifiers. It is to be noted that these amplifiers are not connected to operate in pushpull, but instead amplifier tubes 326 and 328 are connected in cascade to amplify the error voltage between the point 322a and ground while the discharge tubes 327 and 329 are in cascade to amplify the error voltage between terminal 322b and ground.

From the foregoing description it will be readily apparent that the phases between the voltages applied to these amplifiers is not exactly 90° at all times but varies from instant to instant depending upon the respective magnitudes of the error voltages.

The plate output from discharge tube 328 is supplied to the primary 336 of a transformer 337 while the plate output of tube 329 is applied to the primary winding 338 of transformer 339. The output from secondary winding 341 is rectified in diode 342 while the output of the secondary 343 is rectified in diode 344. It should be noted here that the primary windings 336 and 338 are connected in series with the common intermediate terminal 346 being connected to the appropriate plate potential designated by the terminal S4 while the common terminal between the serially connected secondaries 341 and 343 is connected to ground. Appropriate resistors 347 and 348 are connected in series with the respective diodes 343 and 344. It is to be noted that the cathode 342a of the diode 342 is connected to the outer terminal of secondary 341 while its associated anode 342b serves as the output anode while the anode 344a of the diode 344 is connected to the outer terminal of secondary winding 343, the associated cathode 344b serving as the output electrode. It will therefore be apparent that (assuming the windings of the transformers 337 and 339 are wound in the same direction), the polarized outputs from the two diodes 342 and 344 will increase in opposite directions from the ground terminal 351. Accordingly, the other common output terminal 352 of the diodes 342 and 344 will float up and down in polarity and magnitude with respect to the terminal 351 depending upon the relative error signals applied to the terminals 322a and 322b. A suitable bypass condenser 353 is provided to bypass all of the alternating current component from the terminal 352 to ground.

The output from terminal 352 which is dependent upon the error signals developed as a result of the Doppler frequency signal is used to control the operation of the servomotors 148 and 149, the general operation of which was described in connection with Fig. 18. To this end, the terminal 352 is connected through a suitable coupling resistor 354 to the control grid 356 of a duotriode 357 which is connected to operate as a differential amplifier. The two cathodes 358 and 359 are directly connected through a common cathode resistor 361 to conductor 365 and a resistor 362 to a suitable source of negative potential indicated at $S_{11}$ (see Fig. 19-5). This negative potential is approximately 200 volts below ground. The anode 363 is connected through resistor 364 to a source of positive potential indicated at S4. The other cathode 366 is connected to a potential divider 367 which in turn is connected between resistors 368 and 369 which are across the source of potential S4. The other control grid 371 is connected to the lower end of resistor 369 and to ground at 372. A suitable integrating feedback network is connected between the anode 363 and the control grid 356. This integrating network comprises the resistor 373 and either of condensers 374 or 376. The condensers 374 and 376 are alternately connected in the circuit with resistances 373 through the armature $X_7$ of the relay X as it engages contacts $X_8$ and $X_9$ alternately. As will be pointed out hereinafter all of the armatures of the relay X are biased against the upper contacts by springs for example spring 381 and the armatures are moved against the lower contacts by the energization of relay solenoid 409. It is to be noted that the capacity of condenser 374 is approximately 2½ times the capacity of condenser 376 for the purpose of varying the time constant of this integrating network because the output from the differential amplifier 357 is adapted to alternately control the operation of servomotor 148 and servomotor 149, the servomotor 148 being larger than servomotor 149 and therefore having greater inertia. The main purpose of the integrating network is to produce an output representative of a running average of the input frequency so that a reliable output signal can be produced even when the input signal is very erratic. The arm $X_7$ of the relay X is normally biased by means of a spring 381 (Fig. 19-3) against the contact $X_9$ so that the condenser 376 is normally connected in series with the resistor 373 between the grid 356 and the anode 363. Therefore, energization of the relay X causes the arm 7 to be pulled away from contact $X_9$ against contact $X_8$, thereby connecting condenser 374 in series with the resistor 373.

Assuming a positive error signal is applied to the grid 356 the current through the first section of the tube 357 will increase so that the potential of the cathode 358 increases in a positive direction, or in other words, the negative bias on grid 356 decreases thereby increasing the current through plate resistor 364. At the same time the potential of cathode 359 increases in a positive direction due to the cathode current through resistor 361 and since the control grid 371 is connected directly to ground the effective negative bias on grid 371 increases thereby decreasing the current through anode 366 accordingly increasing the potential of cathode 366 tending to increase the current again and thereby arrive at a stable condition. In effect, this differential amplifier serves as a limiting amplifier for all direct current voltages appearing at the output terminal 352 of the previous amplifier. It is to be noted, however, that the condenser 353 bypasses any alternating voltage at terminal 352 to ground thereby causing the control grid 356 to be tied to ground as far as alternating current is concerned. Therefore the amplifier 357 is substantially insensitive to any frequencies which are bypassed by the condenser 356 without appreciable impedance drop.

The output terminal 384 of the amplifier 357 is connected to control grid 386 of a second differential amplifier 385 comprising a duotriode 387. The amplifier 385 has associated with it an electromagnetic amplifier in the form of a saturable reactor controller which controls the speed and direction of the servomotors 148 and 149. The electromagnetic controller constitutes the final amplification stage of the servoamplifier and is generally represented in Figure 18 as a part of the servoamplifier 145. The two cathodes 388 and 389 are connected through a common resistor 391 to ground 372. The anode 392 is connected to energize the winding 393 of saturable reactor 394. Similarly the anode 396 is connected to winding 397 of a second saturable reactor 398. The saturable reactor 394 is provided with a sectional winding 394a one side of which is connected in series with sectional winding 398a of the saturable reactor 398. The two remaining terminals from these windings are connected respectively through terminals $S_9$ and $S_{10}$ of the terminal block S (see Fig. 19-5) to a suitable source of alternating current preferably of 110 volts at 400 cycles or any appropriate voltage and frequency from which the servomotors 148 and 149 are adapted to be energized. The saturable reactor 394 is also provided with a second sectional winding 394b one side of which is connected to the terminal $X_1$ of the relay X and the other side of this winding is connected to one terminal of a second sectional winding 398b of the saturable reactor 398. As will be noted from the circuit diagram, the windings 394b and 398b are so connected relative to their direction of winding so that the voltage induced therein by the respective windings 394a and 398a are in opposition. Accordingly, it will be understood that as the plate current from one of the anodes for example anode 392 increases the current through the winding 393 and will cause saturation of the core thereby reducing the impedance of winding 394b. The motors 148 and 149 are of the two phase type, one field winding of each of these motors is continuously energized and the other quadrature field winding is energized by the control phase which is supplied through the armature $X_1$ of the relay X and the contacts $X_3$ and $X_2$. The fixed phase windings of motors 148 and 149 are preferably connected in series with similar motors for the other frequency tracker channel, these other motors being indicated at 150 and 155. Unequal currents from the cathodes 392 and 396 will cause the control phase to shift, thereby determining the direction of rotation of the respective motors in accordance with the position of the armature $X_1$.

In view of the fact that the characteristics of the automatic frequency control are such that if the control gets too far away from the center of the frequency spectrum there is a tendency for the servomotors 148, 149 to drive the frequency of the local oscillators further away, suitable manually operated means are provided for manually searching the center of the Doppler frequency spectrum. To this end, the double-throw single-pole switch 400 is provided for the purpose of alternately selectively short circuiting resistors 401 and 402. The resistances 401 and 402 are connected in parallel with voltage dividers 403 and 404 the junction point of the two resistors 401 and 402 being connected to the second control grid 406 of the duotriode amplifier 387. It will be readily apparent that when the armature of the switch 400 is moved in either direction to short one of the resistances an abrupt change will be made in the bias on the grid 406 so that through the operation of the associated electromechanical amplifier the operation of the servomotor 148 will be effected, it being understood of course that this servomotor controls the primary frequency control, see Fig. 18. As will be better understood from the subsequent description an additional single-pole double-throw switch 407 (see Fig. 19-2) is mechanically coupled to the switch 400 through the mechanical connection 408 so that when the manual search switch 400 is closed in either position the solenoid 472 is energized which in turn opens the contacts 474 and 476 thus deenergizing solenoid 409 of the relay X thus permitting the armature $X_1$ of the relay to engage the contacts $X_3$ so that the circuit of the control phase to servomotor 148 is completed. The relay coil 472 is normally energized by a free-running multivibrator 470 in a manner hereinafter described but the manual control provided by the switch 400 makes it possible to override the action of the multivibrator when desired.

Appropriate means are provided for disconnecting the servomotors when the energy in the echo wave is unusuable. To this end, the output of one side of the Doppler frequency channels is rectified in diode 411 the output D.-C. potential of which is supplied to the grid 412 of the triode 413. The anode current of triode 413 is adapted to energize the solenoid of a relay 414 provided with an armature 416 which alternately engages contacts 417 or 418 depending upon the value of the anode current from the triode 413.

The second local oscillator corresponding to the local oscillator 158 of Fig. 18 comprises a conventional free-running multivibrator having a duotriode 421. This multivibrator is of conventional construction and complete details are therefore believed to be unnecessary. Suitable diodes 422 and 423 are connected in the control grid input circuits of the two respective sections of triode 421 for the purpose of limiting the input signal. The frequency of oscillation of the local oscillator 158 is controlled by the voltage applied to the control grids 426 and 427 which is supplied through the connection 428 from the voltage divider 430, the arm of which is driven by the servomotor 148 through the mechanical connection 154. This variable voltage control corresponds to the simplified form represented by the potentiometer 153 shown in Fig. 18.

Figure 2:
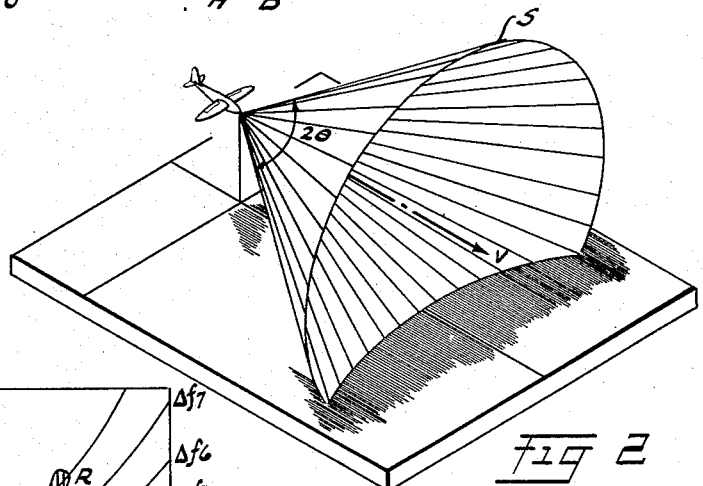
Figure 2 is a perspective view illustrating the type of pattern of radiation and its intersection with the earth's surface, which may be considered a plane surface.

The bias of the cathodes of the diodes 422 and 423 is controlled by the potentiometer 425 which is controlled by the servomotor 149 through the mechanical connection Z, see Figs. 19-1, 19-2. This potentiometer and control is represented diagrammatically in Fig. 18 by the potentiometer 156. The output from the local oscillator 158 is taken from the anode circuit of one section of the duotriode 421, for example, at terminal 436 through resistor 437 which is connected through coupling condenser 438 to the grid 439 of the cathode follower amplifier 441. The output from this amplifier at terminal 442 is supplied through coupling condenser 443 to a special limiting amplifier 420 (see Fig. 20). The output from the limiting amplifier is supplied to a subsequent power amplifier 541 which supplies the servomotor 14 for controlling the positioning of the antenna system 12. The output connection to the subsequent amplifier is indicated at the terminal $U_4$. This terminal corresponds to the conductor 126 of the simplified diagram of Fig. 18. The output of amplifier 441 at terminal 442 is also adapted to be supplied periodically to the control grid 303 of the duotriode 291 by reason of alternate engagement of the armature $X_4$ with the contact $X_5$. The reason for this has been explained in the previous description in connection with Fig. 18 where it was pointed out that the output from the local oscillator 158 is substituted periodically for the Doppler input frequency from connection 130.

It is necessary that the output from the frequency trackers which controls the energization of the motor 14, which controls the position of the antenna system, have a frequency which is exactly equal to the center or average frequency of the respective Doppler spectra. As has been previously described, it is highly important that the frequency trackers continue to measure the exact center of the Doppler spectrum and accordingly it is necessary that the difference between the Doppler frequency and the local oscillator 141 be maintained at exactly 20 kilocycles. Since it is necessary for the frequency trackers to make an absolute measurement of the Doppler frequency, the discriminator need not necessarily be tuned exactly to 20 kilocycles but it is necessary that the output signal from the respective frequency trackers 24, 26 have the same frequency as the centers of the respective Doppler spectra. Accordingly, appropriate means are provided for making a check periodically for any errors due to drift of the local oscillator and the discriminator. During the interval the Doppler input is replaced by the output generator frequency, which frequency is that provided by the local oscillator 158, and the error signal developed in the discriminator output is used to adjust the frequency of the generator output independent of its primary control voltage until no voltage is in the discriminator output. This is accomplished through the use of a free-running multivibrator comprising a duotriode 470. This multivibrator is of conventional construction, one of the anode circuits of the multivibrator including actuating solenoid 472 of relay 473 the armature 474 of which is adapted to engage contact 476. As shown in the drawing the armature 474 is connected to the terminal $S_8$ and is in the circuit for energizing the solenoid 409 of relay X, the other side of the contacting solenoid 409 being connected to terminal $S_7$ and $S_8$ represents a source of D.-C. potential preferably of approximately 28 volts as indicated in Fig. 19-5. It is to be understood in connection with this description that although only one frequency tracker is described the other one is of identical construction and also that it is only necessary in some instances to have one unit which controls the components in both channels. The multivibrator 470 is an example of this since it so energizes an additional relay solenoid 480 of a relay for the other channel corresponding to the relay X of the frequency channel just described.

As is shown in Figs. 16 and 17 there are limiting amplifiers and power amplifiers for each of the channels of the two frequency trackers 24 and 26, because the final output from each channel is compared to produce the final operation of the motor 14 which operates the antenna assembly. However, since the limiting amplifiers and the power amplifiers of each channel are identical in construction and operation, only the amplifiers of one channel will be described herein.

*Frequency comparator amplifier*

Referring to Fig. 20, the limiting amplifier 420 for one of the channels comprises a conventional stage comprising triode 490, the input of which is connected to the terminal $U_4$ of Fig. 19-2 through the coupling condenser 491. The output of the amplifier 490 is coupled through a high value resistor 492 to the control grid of cathode follower 493. The control grid of the amplifier 493 is connected through coupling condenser 494 to a double diode clipper amplifier comprising diodes 496 and 497. The cathode of the diode 496 is connected to terminal 498 which is approximately at a potential of 105 volts which is the maximum to which it is desired to limit the input potential of the cathode follower 493. The anode of the diode 497 is connected through voltage divider 501 to a point which is substantially of zero potential with respect to the point 498 thus limiting the excursion in the opposite direction of the bias on the control grid of the cathode follower 493. The output from the cathode follower 493 is taken from the terminal 502. The channel for the other frequency tracker is provided with an amplifier 520 which is identical in all respects with amplifier 420 and includes the appropriate diode clipping circuit. The output from the amplifier 520 is provided at terminal 521 which is the junction between the cathode resistor and the cathode of the cathode follower 522. As has been previously remarked it is essential that the amplifiers 420 and 520 deliver an output the energy of which is exactly proportional to the frequency. Accordingly, it will be clearly understood that it is very essential that the wave form and the maximum value of the pulses delivered from the two amplifiers be identical. Suitable means are therefore provided to accomplish this result.

The output from terminal 502 which may be designated by the letter L and the output from amplifier 520 designated by the letter R are supplied through coupling condensers 502a and 521a (see Fig. 21), respectively, to a frequency comparator circuit which comprises diodes 526 and 529, inclusive. The signal from channel L is supplied through the condenser 502a to the junction of two diodes 526 and 527 which are connected in series with each other and also in series with two additional diodes 528 and 529. The input from channel R is connected through coupling condenser 521a to the junction 530 between the diodes 528 and 529. The anode of the diode 526 is connected directly to ground and the cathode of the diode 529 is connected to a source of positive potential at a point 531 on a potential divider across the high voltage supply.

The output from the frequency comparator circuit which includes the diodes 526 and 529, inclusive, is supplied to a differential amplifier 541 which in the embodiment illustrated comprises a duotriode 545 connected to have a single-ended input and a pushpull output. In this connection a suitable potential divider 532 is connected between terminal 531 and ground to provide an adjustable bias which can be applied to the grid 542 of the duotriode 545 through the connection 543 for the purpose of providing a main zero adjustment for compensating for the changing characteristics of the tube such as aging, etc.

The junction 535 between the diodes 527 and 528 is bypassed to ground through a condenser 537 which has a capacity very large as compared to the capacity of the condensers 502a and 521a. A suitable bypass condenser 538 of a capacity of a value similar to that of a value of the condenser 537 is connected between the terminal 531 and ground so that, effectively, the cathode of the diode 529 is connected to ground for all frequencies which will be applied over either of the channels L or R. The central junction 535 between the four serially connected diodes 526 and 529, inclusive, constitutes the output terminal for the frequency comparing circuit and is connected to the single ended input grid 544 of the duotriode 545. The cathodes 546 and 547 are connected through a common cathode resistor 548 to a terminal 549 which is at a fixed high negative potential of approximately 105 volts with respect to ground. The cathode 551 is connected through resistor 552 to a source of positive potential and the anode 553 is likewise connected through a resistor 554 to the same source of high positive potential. As is apparent from the previous description the grid 543 of tube 545 is held at substantially ground potential through the connection 543 and the potential divider 532 since the value of the latter resistor is of fairly low value. In accordance with the characteristic operation of a differential amplifier the current through the cathode resistor 548 remains at substantially constant value when one of the grids is held at a substantially fixed potential. Accordingly any signal applied to the grid 544 will cause a variation in the current through resistor 552 thereby causing an accompanying potential drop and a variation in the potential of cathode 551 and since the current through the cathode resistor 548 remains constant the current through anode resistor 554 must change in the opposite direction to produce corresponding opposite change in the potential of cathode 553 thereby producing a pushpull output at the anodes 551 and 553.

The output from the amplifier 541 is connected to the two grids 560 and 561 of amplifier 568 which is connected in a conventional manner as a pushpull input and output amplifier. The pushpull output from the amplifier 568 is supplied to a saturable core transformer magnetic amplifier 563 of a type which is identical with the one previously described in connection with Fig. 19. This magnetic amplifier 563 controls the control phase 564 of motor 14 which controls the azimuth movement of the antenna assembly 12 (see Fig. 17). The fixed phase winding 566 of motor 14 is supplied directly from a suitable source of alternating current 567 while the energization of the control phase winding 564 is controlled by the magnetic amplifier 563. The frequency of the alternating source 567 is comparatively high, for example approximately 400 cycles, so that the control phase 564 may be readily tuned by a shunt condenser 568' of reasonably small capacity.

The operation of the frequency comparator circuit may be very broadly stated by stating that when the frequency of the Doppler frequency from channel L is equal to the Doppler frequency in channel R the rectified direct current through the diodes 527 and 528 will be equal to the current through diodes 528, 529 and the grid 544 of the amplifier 545 will be maintained at its normal value of approximately +2 volts. If the frequency of channel L becomes greater than the frequency through channel R the rectified direct current through diode 527 will be greater than the current through diode 528. It will be apparent from the circuit diagram that accordingly the resultant current will cause an increase in the positive potential to be applied to the grid 544 thereby increasing the anode current through anode resistor 552 resulting in the differential amplifier action. Similarly if the frequency in channel L becomes less than the frequency in channel R the opposite action will take place. It is to be clearly understood that the magnetic amplifier 563 and the two phase windings 564 and 566 of the motor 14 are so sensed that the antenna assembly 12 will be adjusted to cause the motor to rotate the antenna assembly 12 in the direction to reduce the error signal which is proportional to the difference between the frequencies received by the respective forward-looking and the rearwardly-looking antennas as previously described. Referring specifically to the frequency comparing circuit, it must be assumed that the square wave alternating voltage which is supplied by the frequency trackers 24, 26 is a constant amplitude determined by the limiting amplifiers 420, 520 specifically described in connection with Fig. 20.

Assuming for purposes of illustration that the voltage on one of the channels has a value of E and which by reason of the clipping action previously described this voltage is positive with respect to ground, it will be seen that the charge applied through the condenser 502a to the junction point 523 will cause the condenser 502a to be charged in a positive direction by reason of the current flowing through diode 527 and condenser 537 to ground. On the other hand, any small negative signal which may be applied to the point 523 will cause a current to flow through the diode 526 to ground thereby tending to reduce the charge on the condenser 537. Any positive charge on the condenser 537 can leak to ground through the diodes 528 and 529. This may be explained from the theoretical standpoint by reference to the usual equation $$Q = C(E-E') \qquad (a)$$

where Q is the charge, C is the capacity of the condenser 537, E is the amplitude of the potential impressed through the condenser 502a and E' is the potential at the point 535. The large capacity of the condenser 537 smoothes out any ripples and these pulses of potential cause a steady current $i$ to flow through the resistor 532. This current may be considered to be the integral of the electric energy or charge usually measured in terms of coulombs per second which are accumulated and discharged through the resistor 532 from the condenser 537. In other words, $$i = fQ \qquad (b)$$

where $f$ is the frequency of the signal impressed on the condenser 502a. Substituting from Equation $a$ we obtain the expression $$i = fC(E-E') \qquad (c)$$

Considering the voltage at the point 523 to be $E_f$ it will be apparent that this voltage is equal to the potential of point 535 plus the potential drop in resistor 532 or, in other words, $E_f$ is equal to $E'$ plus $iR$ where R is the resistance of the resistor 532.

Substituting from the above equations the expression $$E_f = E' + fRC(E-E') \qquad (d)$$

is derived. Since the values of R and C are constant and the value of the signal E is made constant by the previously described clipper amplifier, E' will also be constant leaving $E_f$ as the only variable which will vary only as the frequency varies. Accordingly, the currents through the diodes 527, 528 are proportional to the Doppler frequency inputs from the respective input channels L and R. Because of the serial arrangement of the diodes the polarity of the resultant direct current voltage applied at terminal 535 will be determined by which of the signals from the channels L and R is the greater.

A complete worldwide navigation system in which the present invention is adapted to serve as one of the components, is illustrated in Fig. 22. The system comprises the velocity and direction indicator unit 600, a heading reference unit 601 and a computer navigator unit 602. The velocity and direction information supplied by the present invention is combined with the information furnished by the heading reference unit 601 which continuously supplies an azimuth reading of the original point of departure and the information from both of these units is supplied to the computer navigator 602 which continuously computes the course distance to destination and the exact position of the aircraft in terms of latitude and longitude.

In the practical application of the present invention the velocity and direction indicator unit 600 comprises a subunit 600a including the transmitter-modulator and the receiving system. This subunit 600a is connected to the antenna assembly 12 by means of wave guides. The antenna assembly 12 is supported from the aircraft by means of a suitable mount 603 shown in Figs. 8, 9 and 10 and which is adapted to permit relative movement between the frame of the aircraft and the antenna assembly about the transverse and vertical axes. The wave guides are electrically connected to the antenna assembly 12 by means of suitable conventional rotary joints. The direction indicator unit 600 is energized from suitable power means 604 and 606 which also energizes the heading reference unit 601 and the computer navigating unit 602 as well as the servomotor mechanism which holds the antenna assembly 12 on an even keel in response to the vertical gyro 40. The velocity and direction indicator unit 600 also includes the frequency tracker and servo amplifier unit 609 which is connected to the transmitter-modulator receiver unit 600a by means of leads 609a. The output from the unit 609 is supplied through cable 611 to energize the motor 14 which determines the azimuthal position of the antenna assembly 12. It is to be understood that the portion of the output from unit 609 which is supplied through the cable 611 is the comparison signals from the antenna which keeps the antenna assembly 12 constantly oriented along the velocity vector as previously described. In the complete navigation system the unit 609 also supplies the signal over cables 612, which represent the speed and direction, to the computer navigator unit 602 where this information is compared with the information from the heading reference unit 601.

From the foregoing description, it will be apparent that the present invention provides a novel and improved navigation component which is capable of supplying continuously very accurate information as to the direction and speed of aircraft under conditions of zero visibility or where the craft is flying so high that the earth is not visible. One of the salient features of the invention is the provision of means for maintaining a constant heading reference by maintaining the axis of the antenna system at a constant relation with respect to the direction of travel and for averaging the small errors of deviation.

Another important feature which contributes to the overall efficient operation is the antenna assembly with the special antenna arrays which provides return signals of maximum energy confined to a frequency spectrum of minimum width. The minimum-threshold feature insures that when the return signals fall below a predetermined unusable threshold value, the orientation of the antenna will retain the position it had just before the signals fell below the threshold value until the signals again increase above the threshold value. Experience shows that the present system is subject to a very minimum error.

What is claimed is:

1. A system for determining the speed and drift of an aircraft relative to the earth's surface comprising, means for transmitting electromagnetic waves from the aircraft to the earth's surface, means directively receiving signals reflected from a plurality of illuminated areas on the earth's surface, which areas are spaced longitudinally and transversely with respect to the ground path of said aircraft, means for comparing the frequencies of the signals reflected from illuminated areas spaced transversely of said ground path for determining the drift of said aircraft, and means comparing the frequencies of the signals reflected from illuminated areas spaced longitudinally of said ground path for determining the speed of said aircraft.

2. A system for determining the speed and drift of an aircraft relative to the earth's surface comprising, means for transmitting electromagnetic waves from the aircraft to the earth's surface, means directively receiving signals reflected from a plurality of illuminated areas on the earth's surface, which areas are spaced longitudinally and transversely with respect to the ground path of said aircraft, means for comparing the center spectra of the frequencies of the signals reflected from illuminated areas spaced transversely of said ground path for determining the drift of said aircraft, and means comparing the center spectra of the frequencies of the signals reflected from illuminated areas spaced longitudinally of said ground path for determining the speed of said aircraft.

3. A system for determining the speed and direction of travel of a vehicle relative to the earth or other planetary body adapted to be mounted on a vehicle for facilitating the navigation of the vehicle relative to the earth or any planetary body comprising, means for directing microwave energy from said vehicle toward the earth or planetary body, means carried by said vehicle including antenna means rotatably mounted about a vertical axis on said vehicle for receiving microwave energy simultaneously from a plurality of areas on said body spaced on axes extending transversely of and spaced in a direction parallel to the direction of travel of said vehicle relative to the earth and having a predetermined constant relation to the direction of travel of said vehicle relative to the earth, means for determining the center of the frequency spectrum received from each area, means for producing utilization signals which are functions of the centers of said frequency spectra received from areas spaced transversely of the direction of travel, means responsive to utilization signals derived from areas spaced transversely of the direction of travel for maintaining fixed orientation of said receiving means relative to the direction of travel and means responsive to utilization signals derived from at least one area spaced transversely of the ground track and an area spaced therefrom in a direction parallel to the direction of relative travel for determining the speed of said vehicle with respect to the earth or planetary body.

4. A system for determining the speed and direction of travel of a vehicle relative to the earth's surface and adapted to be mounted on a vehicle for facilitating navigation comprising means for directing microwave energy from said vehicle toward the earth, means rotatably carried by said vehicle for receiving wave energy reflected from a plurality of areas on said body spaced on axes extending transversely of and spaced in a direction parallel to the direction of travel of said vehicle relative to the earth's surface and having a predetermined constant relation to the direction of relative travel, means for determining the centers of the frequency spectrum received from each area, means responsive to a comparison of the centers of the spectra of the frequencies from an area spaced transversely of the direction of travel for maintaining a fixed orientation of said receiving means with respect to the direction of travel of said vehicle relative to the earth and means responsive to a comparison of the spectra of frequencies received from areas spaced in a direction parallel to the direction of travel for determining the speed of travel.

5. A system for determining the speed and direction of travel of a mobile craft relative to the earth's surface and adapted to be mounted on said craft, means for directing microwave energy from said vehicle toward the earth, means rotatably carried by said vehicle for receiving microwave energy reflected from a plurality of areas on the earth's surface spaced on axes extending transversely of and spaced in a direction parallel to the direction of travel relative to the earth's surface and having a predetermined constant relation to the direction of travel of said vehicle relative to said body, means for deriving from said received microwave energy signals proportional to the value of the instantaneous center of the Doppler frequency spectrum received from areas spaced transversely of the direction of travel for maintaining a predetermined constant relation between said receiving means and the direction of travel, means responsive to the centers of the frequency spectra received from areas spaced in a direction parallel to the direction of travel for determining the speed of said craft, and means associated with each of said receiving means for continuing to produce signals of the values existing at the instant next preceding the instant at which the derived signals fall below predetermined threshold values until subsequent instantaneous signals are derived which are above the respective threshold values.

6. A navigation system for determining the speed and direction of travel and mobile craft relative to the earth's surface and adapted to be mounted on said craft comprising, means rotatably mounted on said craft and including a plurality of antennas for directing microwave energy toward the earth, said antennas having directivity patterns in the form of sections of a conical surface directed toward areas on the earth symmetrical about hyperbolic axes which are symmetrical transversely of and spaced in a direction parallel to the direction of travel of said vehicle relative to the earth's surface and means including said antennas for simultaneously receiving microwave energy reflected from each of said spaced areas, means for determining the center of power of the frequency spectrum received by each antenna, and means responsive to a comparison of the centers of power of said frequency spectra derived from areas spaced transversely of the velocity vector for controlling the orientation of said antennas to maintain the axes of said directivity patterns parallel to the velocity vector of the craft and means responsive to a comparison of the center of power of signals derived from wave energy reflected from areas spaced longitudinally of the direction of travel for determining the speed of said craft.

7. A system for determining the speed and direction of travel of a vehicle relative to the earth's surface and adapted to be carried by said vehicle for facilitating the navigation of the latter relative to the earth comprising, a first antenna array, a second antenna array, a third antenna array, means for mounting said antenna arrays for rotation in unison about a common vertical axis, means for simultaneously energizing said antenna arrays with pulsed microwave energy for propagation toward the earth, said first and second antenna arrays having arcuate directive patterns which illuminate the earth's surface over a hyperbolic area which is wide in the direction along the hyperbolic curve and narrow in a direction normal thereto, the arcuate directive gain patterns of said first and second antenna arrays being directed substantially opposite to that of said third antenna array with the axis of the gain patterns being substantially parallel to the velocity vector, means responsive to a comparison of the main frequencies received by said first and second antenna arrays for maintaining said arrays at a constant relation to the direction of travel relative to said body to thereby directly indicate the drift of said vehicle and means responsive to a comparison of the mean frequency of one of said first or second antenna arrays with the mean frequency from said third antenna array for determining the relative speed.

8. A system for determining the speed and direction of travel of a vehicle relative to the earth's surface and adapted to be mounted on said vehicle for facilitating the navigation of the latter comprising microwave generator means, means for directing microwave energy from said vehicle toward the earth, means rotatably mounted on said vehicle for rotation about a vertical axis for receiving simultaneously microwave energy reflected from areas symmetrical about hyperbolic axes which are symmetrical transversely of and spaced in a direction parallel to the direction of travel of said vehicle relative to the earth, said latter means including a plurality of antennas, each having a directivity pattern for producing a conical beam of radiation and being so mounted that microwave energy received by each of said antennas will be distributed over a relatively narrow spectrum of frequencies reflected from hyperbolic areas, means for determining the center of the spectrum of frequencies received by each antenna, means responsive to a comparison of the centers of the frequencies received from areas spaced transversely of the axis of relative travel for maintaining a fixed orientation of said antennas relative to the direction of movement, and means responsive to a comparison of the centers of frequency received from areas spaced in a direction parallel to the direction of travel for determining the relative speed.

9. A navigation system adapted to be mounted on a vehicle for navigating the vehicle relative to the earth's surface comprising, two linear antenna arrays arranged side by side, each array being so phased as to produce a conical beam of radiation with the axis of said conical beam in a plane which is substantially parallel to the direction of travel so that portions of said conical radiation illuminate the earth's surface over a hyperbolic area symmetrically disposed transversely relative to the direction of travel, means on said vehicle for radiating microwave energy from said vehicle toward the earth's surface, means including said antenna arrays for receiving microwave energy reflected from the earth; means for determining the frequency difference between the energy reflected from portions of said conical beam disposed transversely of the direction of travel, and means responsive to said frequency difference for maintaining the axis of said conical beam fixed with respect to the direction of travel, an additional antenna array mounted to move in unison with said first antenna arrays and phased so as to produce a conical beam of radiation parallel to but in the opposite direction to said first beam of radiation, and means responsive to the difference of the center of the frequency spectra of said conical beams for determining the speed of said vehicle.

10. A navigation system adapted to be mounted on a vehicle for naviating the latter relative to the earth's surface comprising first and second linear antenna arrays, each having conical directivity patterns, said antenna arrays being rotatably mounted on said vehicle and adapted to be rotated so the axes of said conical beams may be maintained in a plane parallel to the direction of travel, the directivity patterns of said antenna arrays intersecting the earth's surface in selected distinct portions of a hyperbolic area which is symmetrically disposed on opposite sides of the centerline of the vehicle and is wide in the direction along the hyperbolic curve and narrow in a direction normal thereto, a third antenna array mounted to rotate in unison with said first and second antenna arrays and having a conical directivity pattern in the direction opposite to the directivity pattern from said first and second antenna arrays, means for radiating microwave energy from said vehicle toward the earth, means including all of said antenna arrays for simultaneously receiving signals reflected from bi-dimensionally spaced areas on the earth's surface, means responsive to the centers of the spectra of frequencies received by said first and second arrays for maintaining a constant orientation of said antenna arrays with respect to the direction of travel and means responsive to the difference in frequencies reflected from the earth and received by one of said first or second arrays and frequencies received by said third antenna array for determining the relative speed of said vehicle.

11. A navigation system for mobile craft and adapted to be mounted on the latter for facilitating the navigation of the latter relative to the earth, comprising means for transmitting radio frequency pulses from said craft toward the earth including a dirigible antenna assembly pivotally assembled on said craft about a vertical axis for receiving wave energy reflected from the earth's surface resulting from the transmitted radio frequency pulses, said assembly having a plurality of arrays arranged to provide diverging conical gain patterns for receiving simultaneous wave energy reflected from points on the earth spaced on axes extending transversely of and spaced in a direction parallel to the direction of relative travel, means responsive to the difference in frequency of wave energy reflected from areas spaced transversely of the ground track for maintaining said assembly at a constant orientation with respect to the ground track of said craft and means responsive to the difference in frequency of wave energy reflected from areas spaced in directions parallel to the ground track for determining the speed of said craft.

12. A navigation system adapted to be carried by aircraft comprising, a dirigible antenna assembly having a plurality of electrically independent arrays mounted for pivotal movement in unison about a vertical axis, at least two of said arrays being so mounted and oriented as to provide additive longitudinal directivity components along the ground track and equal and opposite directivity components at right angles to the ground track, at least one other array having a directivity component extending in a direction opposite to the longitudinal components of said first arrays, means carried by said craft for radiating microwave energy toward the surface of the earth, means responsive to the difference in frequencies received by said first two arrays for maintaining the fixed orientation of said antenna assembly relative to the ground track, and means responsive to the difference in frequencies received by said first arrays and said third array for determining ground speed.

13. A navigation system adapted to be carried by aircraft comprising an antenna assembly mounted for pivotal movement about a vertical axis, said antenna assembly including a plurality of elongated members constituting arrays rigidly connected together with their longitudinal axes in substantially parallel relationship, each of said elongated members being provided with means for radiating microwave energy along their length and for phase retarding the microwave travelling therethrough, shielding means for each of a pair of said elongated members whereby the patterns of radiation produced thereby constitute separate portions of a conical surface whose apex is at said antenna assembly, a third elongated antenna array in said assembly, means for supplying pulsed microwave energy to be radiated by said arrays, said elongated members being provided with means for phasing microwave energy so that the axis of the cone of radiation from said pair of elongated members is opposite to the cone of radiation from said third elongated member, means including said elongated members for receiving microwave energy reflected from bi-dimensionally spaced areas resulting from the transmitted pulses, means responsive to the difference in frequency of the reflected signals received by said pair of antenna arrays for maintaining a fixed relation between the orientation of said assembly and the direction of travel and means responsive to the difference in frequencies received by said pair of arrays and said third array for determining the speed of said vehicle.

14. A navigation system adapted to be carried by a vehicle for facilitating navigation of the latter relative to the earth's surface comprising first and second antenna arrays each having a conical-shaped directivity pattern, means for dirigibly mounting said arrays on said vehicle so that the axes of the respective directivity patterns may be adjustable with respect to the vehicle heading, the directivity patterns of said beams intersecting the earth's surface in selected distinct portions of a hyperbolic area which is wide in the direction along a hyperbolic curve and narrow in a direction normal thereto, a third antenna array having a conical directivity pattern directed oppositely to the patterns of said first and second antenna arrays and fixedly mounted with respect to said first and second antenna arrays, means for transmitting microwave energy from said vehicle toward the earth's surface, means including said antenna arrays for simultaneously receiving microwave energy reflected from bi-dimensionally spaced areas on the earth's surface which reflected microwave energy originated from the transmitted microwave energy, means for deriving signals proportional to the value of the instantaneous center of the frequency spectrum received from each spaced area by the respective antenna arrays and for continuing to produce a signal of the value existing at the instant next preceding the instant at which the derived signals fall below a predetermined threshold value until a subsequent instantaneous signal is derived which is above the threshold value, means responsive to the signals received by said first and second arrays for maintaining a fixed relation between said antenna arrays and the ground track of the vehicle and means responsive to a comparison of the frequencies received from said first and second antenna arrays with the frequencies received by said third array for determining instantaneous speed of said vehicle.

References Cited in the file of this patent

UNITED STATES PATENTS

| | | |
|---|---|---|
| 2,403,625 | Wolff | July 9, 1946 |
| 2,422,064 | Anderson et al. | June 10, 1947 |
| 2,435,615 | Varian et al. | Feb. 10, 1948 |
| 2,435,988 | Varian | Feb. 17, 1948 |
| 2,461,144 | Cook | Feb. 8, 1949 |
| 2,464,276 | Varian | Mar. 15, 1949 |
| 2,473,175 | Ridenour | June 14, 1949 |
| 2,476,032 | Feldman et al. | July 12, 1949 |